(12) United States Patent
Garcia-Morchon et al.

(10) Patent No.: US 10,439,800 B2
(45) Date of Patent: Oct. 8, 2019

(54) CRYPTOGRAPHIC SYSTEM ARRANGED FOR KEY SHARING

(71) Applicant: KONINKLIJKE PHILIPS N.V., Eindhoven (NL)

(72) Inventors: Oscar Garcia-Morchon, Aachen (DE); Ronald Rietman, Eindhoven (NL); Ludovicus Marinus Gerardus Maria Tolhuizen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 145 days.

(21) Appl. No.: 15/507,533

(22) PCT Filed: Aug. 25, 2015

(86) PCT No.: PCT/EP2015/069384
§ 371 (c)(1),
(2) Date: Feb. 28, 2017

(87) PCT Pub. No.: WO2016/034453
PCT Pub. Date: Mar. 10, 2016

(65) Prior Publication Data
US 2017/0310472 A1    Oct. 26, 2017

(30) Foreign Application Priority Data
Sep. 4, 2014 (EP) ..................... 14183474

(51) Int. Cl.
*H04L 9/08* (2006.01)
*H04L 9/30* (2006.01)
(Continued)

(52) U.S. Cl.
CPC .............. *H04L 9/08* (2013.01); *H04L 9/008* (2013.01); *H04L 9/083* (2013.01); *H04L 9/0816* (2013.01);
(Continued)

(58) Field of Classification Search
CPC ......... H04L 9/08; H04L 9/008; H04L 9/0816; H04L 9/3093; H04L 9/0847; H04L 9/0838; H04W 12/04
See application file for complete search history.

(56) References Cited

U.S. PATENT DOCUMENTS 6,996,724 B2   2/2006 Murakami et al.
8,316,237 B1   11/2012 Felsher et al.
(Continued)

FOREIGN PATENT DOCUMENTS

| JP | 2013090199 A | 5/2013 |
| WO | 2006003532 A1 | 1/2006 |
| WO | 2010046799 A2 | 4/2010 |

OTHER PUBLICATIONS

Blundo et al: "Perfectly-Secure Key Distribution for Dynamic Conferences"; Advances in Cryptology—CRYPTO'92, LNCS 740, pp. 470-486, 1993.

(Continued)

*Primary Examiner* — Beemnet W Dada

(57) ABSTRACT

A cryptographic system is provided comprising multiple configuration servers (200, 201, 202) arranged to configure multiple network devices (300, 350, 360) for key sharing. Each configuration server comprising a computation unit (220) arranged to compute local key material for the network device from root key material specific to the configuration server and the network device identity number of the network device that is being configured. At least two configuration servers of the multiple configuration servers provide computed local key material to said network device. The network devices are configured to determine a shared key with any one of multiple network devices. A network device comprises a shared key unit (330) arranged to derive (Continued)

a shared key from another network device's identity number and at least two of the multiple local key materials of the network device.

13 Claims, 6 Drawing Sheets

(51) Int. Cl.
*H04L 9/00* (2006.01)
*H04W 12/04* (2009.01)

(52) U.S. Cl.
CPC .......... *H04L 9/0838* (2013.01); *H04L 9/0847* (2013.01); *H04L 9/3093* (2013.01); *H04L 9/30* (2013.01); *H04W 12/04* (2013.01)

(56) References Cited

U.S. PATENT DOCUMENTS

| | | | |
|---|---|---|---|
| 8,416,949 B2 | 4/2013 | Asano et al. | |
| 8,495,373 B2 * | 7/2013 | Garcia Morchon | H04L 9/0838 380/30 |
| 8,588,411 B2 | 11/2013 | Maas et al. | |
| 9,686,075 B2 | 6/2017 | Gomez et al. | |
| 9,722,787 B2 | 8/2017 | Morchon et al. | |
| 2003/0133576 A1 | 7/2003 | Grumiaux | |
| 2009/0323972 A1 | 12/2009 | Kohno et al. | |
| 2010/0153724 A1 | 6/2010 | Staring | |
| 2010/0235627 A1 | 9/2010 | Kerschbaum et al. | |
| 2011/0206201 A1 | 8/2011 | Garcia et al. | |
| 2013/0080765 A1 | 3/2013 | Mohanty et al. | |
| 2014/0047237 A1 | 2/2014 | Parrish | |

OTHER PUBLICATIONS

Zhou et al: "Multiple-Key Cryptography-Based Distributed Certificate Authority in Mobile Ad-Hoc Networks"; IEEE Globcom, 2005, pp. 1681-1685.

* cited by examiner

US 10,439,800 B2

CRYPTOGRAPHIC SYSTEM ARRANGED FOR KEY SHARING

CROSS-REFERENCE TO PRIOR APPLICATIONS

This application is the U.S. National Phase application under 35 U.S.C. § 371 of International Application No. PCT/EP2015/069384, filed on Aug. 25, 2015, which claims the benefit of European Application No. 14183474.7, filed on Sep. 4, 2014. These applications are hereby incorporated by reference herein.

FIELD OF THE INVENTION

The invention relates to a cryptographic system, a network device, a sharing method, a computer program and a computer readable medium.

BACKGROUND OF THE INVENTION

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key.

Key agreement protocols are useful, e.g., to secure communication, e.g., to encrypt and/or authenticate messages between the parties.

Practical key agreements protocols were introduced in 1976 when Whitfield Diffie and Martin Hellman introduced the notion of public-key cryptography. They proposed a system for key agreement between two parties which makes use of the apparent difficulty of computing logarithms over a finite field GF(q) with q elements. Using the system, two users can agree on a symmetric key. The symmetric key may then be used for say, encrypted communication between the two parties.

The Diffie-Hellman system for key agreement is applicable when the parties do not yet have a shared secret. The Diffie-Hellman key agreement method requires resource-heavy mathematical operations, such as performing exponentiation operations over a finite field. Both the exponent and the field size may be large. This makes key agreement protocols less suitable for low-resource devices. On the other hand key agreement protocols would be very useful in resource-restrained devices. For example, in application areas such as the internet of things, ad-hoc wireless networks, and the like, key agreement could be used to protect links between devices. Another example is communication between a reader and an electronic tag, say a card reader and a smart card, or a tag reader and tag, e.g., an RFID tag or an NFC tag.

Another approach to the problem of setting up secure connections between pairs of network devices in a given communications network is given in C. Blundo, A. De Santis, A. Herzberg, S. Kutten, U. Vaccaro and M. Yung, "Perfectly-Secure Key distribution for Dynamic Conferences", Springer Lecture Notes in Mathematics, Vol. 740, pp. 471-486, 1993 (referred to as 'Blundo').

This system assumes a central authority, also referred to as the network authority or as the Trusted Third Party (TTP), that generates a symmetric bivariate polynomial $f(x,y)$, with coefficients in the finite field F with p elements, wherein p is a prime number or a power of a prime number. Each device has an identity number in F and is provided with local key material by the TTP. For a device with identifier $\eta$, the local key material is the coefficients of the polynomial $f(\eta,y)$. If a device $\eta$ wishes to communicate with device $\eta'$, it uses its key material to generate the key $K(\eta, \eta')=f(\eta, \eta')$. As f is symmetric, the same key is generated. The local key material is secret. Knowledge of the local key material would directly compromise the system. In particular it would allow an eavesdropper to obtain the same shared key. The method requires that each device in a network of devices has its own unique identity number and local key material.

A problem of this key sharing scheme occurs if an attacker knows the key material of t+1 or more devices, wherein t is the degree of the bivariate polynomial. The attacker can then reconstruct the polynomial $f(x,y)$. At that moment the security of the system is completely broken. Given the identity numbers of any two devices, the attacker can reconstruct the key shared between this pair of devices.

The Trusted Third Party forms a single point of failure. If the trusted third party is compromised, and its root key material is leaked, the key material of all network devices may be computed. All communication using keys derived, from the local key material, and ultimately from the root key material may be compromised, e.g. encryptions may be broken, authentication may be forged etc.

Indeed, the trusted third party itself could reconstruct the keying material of individual nodes and the key between any pair of nodes from its root key material and the nodes' identities. Thus, the TTP can overhear all communication in the network. This may be an undesirable situation is certain circumstances, as it requires a very high level of trust.

SUMMARY OF THE INVENTION

A cryptographic system comprising multiple configuration servers arranged to configure multiple network devices for key sharing is provided.

Each configuration server comprises
  a key material obtainer arranged to obtain in electronic form root key material specific for the configuration server,
  a network device manager arranged to obtain in electronic form a network device identity number of a network device of the multiple network devices that is being configured,
  a computation unit arranged to compute local key material for the network device from the root key material and the network device identity number, and
  the network device manager being further arranged to provide the computed local key material to the network device that is being configured,
  for each network device of the multiple network devices, at least two configuration servers of the multiple configuration servers provide computed local key material to said network device, the network device being arranged to add said at least two provided computed local key materials together obtaining a single combined local key material.

As network devices receive local key material from at least two different configuration servers, the single point of failure introduced by using a trusted third party is removed. Network devices may use local key material obtained from more than 1 configuration server. Even if one configuration server were compromised the keys derived by the network devices who previously received local key material from the compromised configuration server, are still secure. Moreover, one single configuration server cannot derive keys because the keys generation process uses the local key material of multiple configuration servers to derive a single key. Thus the level of trust that is required to use multiple configuration servers is smaller than if there were only a single configuration server.

For example, the root key material may comprise a bivariate polynomial and computing the local key material by a configuration server for a network device may comprise obtaining a univariate polynomial by substituting the network device identity number into said particular polynomial. Univariate polynomials are compatible with addition as a combination operator. This allows network device to, e.g., add univariate polynomials, or to add intermediate keys derived therefrom.

An aspect of the invention concerns a first network device configured to determine a shared key with any one of multiple network devices. The first network device comprising an electronic storage arranged to store a first network device identity number, a receiver arranged to receive multiple local key materials from at least two different configuration servers of multiple configuration servers, a communication unit arranged to obtain a second network device identity number of a second network device of the multiple network devices, and to provide the first network device identity number to the second network device, and a shared key unit arranged to derive a shared key from the second network device identity number and at least two of the multiple local key materials of the first network device, wherein the shared key unit (330) is arranged to combine the at least two of the multiple local key materials of the first network device together obtaining a single combined local key material, the shared key unit (330) is arranged to add the at least two local key materials to combine them, the shared key being derived from the second network device identity number and the combined local key material.

For the network device the risk that its shared key is compromised through a failure at different site, e.g., the trusted third party, is reduced. Even if one of its multiple local key materials were known there would still be another local material from which the shared key is derived. Accordingly, the single point of failure is removed. Moreover, a single configuration server cannot derive keys because the keys generation process uses the local key material of multiple configuration servers.

In an embodiment, the shared key unit is arranged to combine the at least two of the multiple local key materials of the first network device together obtaining a single combined local key material, the shared key being derived from the second network device identity number and the combined local key material. For example, the local key materials may be added. After the combining the original key material may be deleted, thus reducing storage requirements. As the original key materials are no longer present in the device, collusion attacks become more difficult. Furthermore, further calculation using the combined local key material is more efficient.

Instead of combining the key material into a single combined key material, the shared key unit may be arranged to derive a first intermediate shared key from the second network device identity number and a first local key material of the multiple local key materials of the first network device, and arranged to derive a second intermediate shared key from the second network device identity number and a second local key material of the multiple local key materials of the first network device, the shared key being derived by combining the first and second intermediate keys. Any number of local key materials larger, than 1, may be used.

In both cases, the at least two key materials influence the shared key that results.

In an embodiment of the cryptographic system, local key material comprises a polynomial, e.g., a univariate polynomial, the network devices being arranged to add the at least two provided computed local key materials together obtaining a single combined local key material by adding said at least two provided polynomials. For example, the root key material specific for the configuration server may comprise one or more multivariate, e.g., bivariate, polynomials from which the local key material for a network device is computed.

In an embodiment, the multiple local key materials are stored at the first network device together with multiple associated configuration server identifiers, a configuration server identifier indicating a configuration server from which the associated local key material was received at the first network device, the first network device comprising a configuration unit arranged to agree with the second network device on a subset of multiple configuration server identifiers such that the first and second network device both have local key material associated with the configuration servers of the subset.

This system allows network devices to accumulate more local key material. For example, this allows migrating between configuration servers now possible without downtime and without compromising the system. If key materials are stored as a single combined key material, during migration a configuration server may send additional key material, that when combined with the stored combined key material has the effect or removing an old key material from the combination and optionally directly adding a new key material. This complicates collusion attacks.

The method of key sharing described herein may be applied in a wide range of practical applications. Such practical applications include: Home automation, mobile communication, and the like.

In an embodiment, the shared key unit is arranged to derive a shared key from the second network device identity number and at least three or at least four of the multiple local key materials of the first network device, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1a schematically shows as a block diagram an example of an embodiment of a cryptographic system, FIG. 1b schematically shows as a block diagram an example of an embodiment of an electronic storage.

Figure 1A:
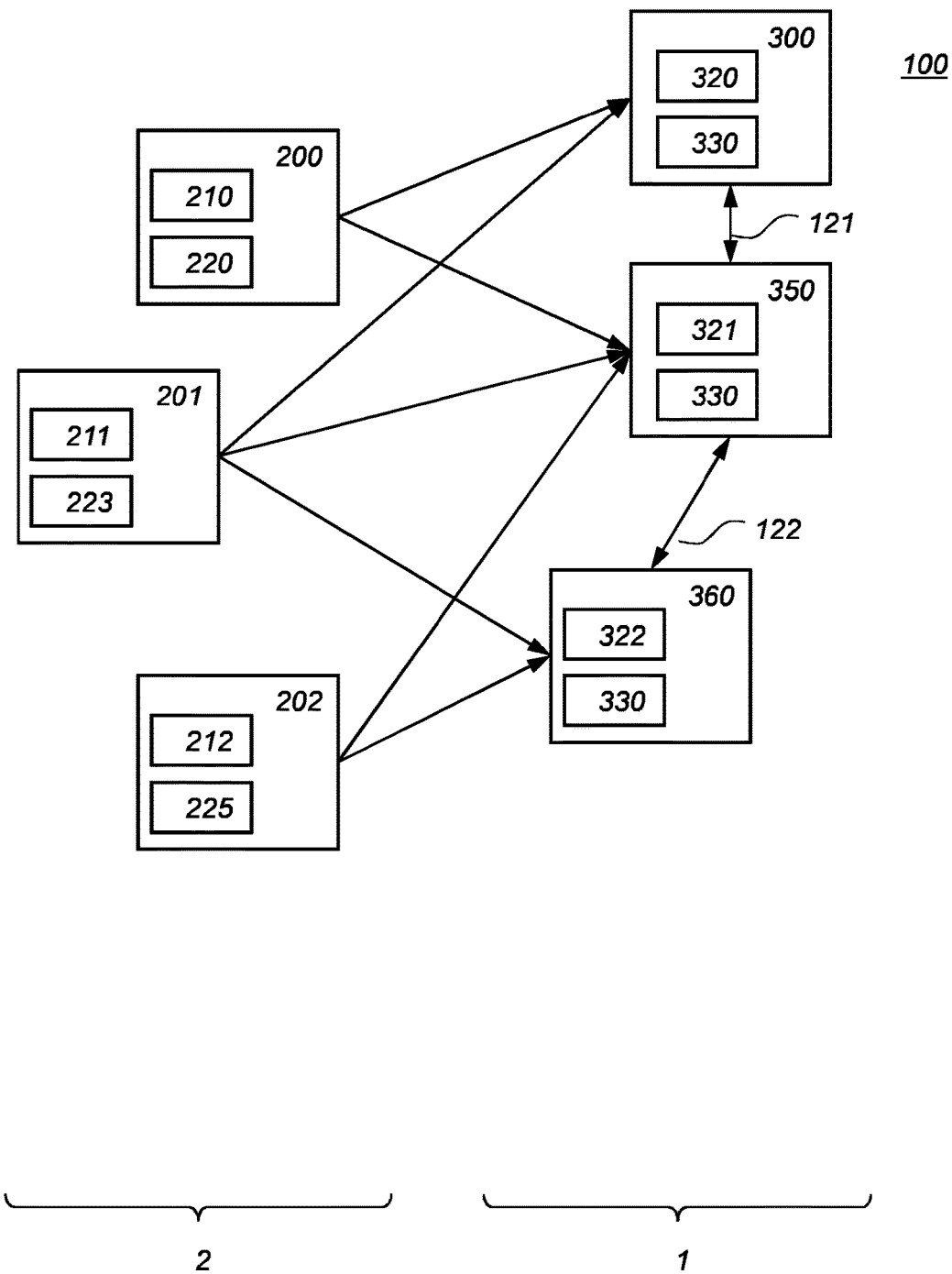

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS IN FIGS. 1-4, 6

1 multiple configuration servers
2 multiple network devices
100,102 a key sharing system
110 a personalization device
121, 122 a key sharing
200, 201, 202 a configuration server
210, 211, 212 a key material obtainer
220, 223, 225 a computation unit
222 a substituting unit
224 a polynomial reduction unit
226 a polynomial addition unit
228 sum of a set of univariate polynomials
229 univariate private key polynomial
230 a network device manager
232 an identity number message
236 a private key material message
238 a connection
240 a polynomial manipulation unit
250 a parameter set
252 a first private set of bivariate polynomials
254 a second private set of reduction integers
256 a public global reduction integer
276 a configuration server identifier
300 a first network device
310 an identity number
320, 321, 322 an electronic storage
330 a shared-key unit
332 a substituting unit
334 an integer reduction unit
336 a key reconciliation unit
340 a key derivation device
342 a communication unit
345 a cryptographic unit
350 a second network device
355 an identity number
360 a third network device
370 a first key material set
372 a private univariate key polynomial
374 a public global reduction integer
376 a configuration server identifier
380 a second key material set
382 a private univariate key polynomial
386 a configuration server identifier
390 a configuration unit
400 an integrated circuit
410 an interconnect
420 a processor
430 a memory
440 an I/O unit
450 a computation unit

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following, for sake of understanding, the circuitry is described in operation. However, it will be apparent that the respective elements are arranged to perform the functions being described as performed by them.

FIG. 1a schematically shows as a block diagram an example of an embodiment of a cryptographic key sharing system 100.

Key sharing system 100 comprises multiple configuration servers 2 arranged to configure multiple network devices 1 for key sharing.

FIG. 1a shows configuration servers 200, 201 and 202. There are at least two configuration servers.

Each configuration server comprises a key material obtainer, a network device manager, a computation unit, and a network device manager. For clarity, FIG. 1a only shows the key material obtainers and the computation units. FIG. 1a shows for configuration server 200, the key material obtainer 210 and the computation unit 220; for configuration server 201, the key material obtainer 211 and the computation unit 223; and for configuration server 202, the key material obtainer 212 and the computation unit 225. The computation unit 220, 223, and 225 may share the same design.

The key material obtainers are arranged to obtain in electronic form root key material specific for the configuration server; different configuration servers have different root key material. For example, a key material obtainer may generate the root key material, or may receive the root key material; in an embodiment the key material obtainer comprises storage, storing the root key material, from which the key material obtainer retrieves it. In an embodiment, the root key material comprises one or more private bivariate polynomials ($f_i(,)$). A storage may be an electronic memory, magnetic storage, optical storage and the like.

The network device manager is arranged to obtain in electronic form a network device identity number (A) of a network device of the multiple network devices 1 that is being configured.

Computation unit 220 is arranged to compute local key material for the network device from the root key material and the network device identity number (A). Local key material is also referred to as a key material set.

In an embodiment, the computation unit is arranged to substitute the network device identity number into the one or more private bivariate polynomials ($f_i(A,)$), obtaining one or more univariate polynomials from which the local key material is derived; the local key material comprising a univariate polynomial.

The network device manager 230 is further arranged to provide the computed local key material to the network device that is being configured. One way to provide is to send. For example, the network device manager 230 may be further arranged to send the computed local key material to the network device that is being configured.

Configuration servers may be implemented as say a web server. The network device manager may be implemented with a computer-network connection, say a LAN network, or the Internet. Configuration servers need not use a computer network connection; they may also be directly connected to the network device under configuration. The latter may for example be suitable for use together with manufacture of network devices. Different types of configuration servers may be combined in a single embodiment of system 100. Connections for transferring local key material from a configuration server to a network device have been illustrated in FIG. 1a as arrows from the multiple configuration servers 2 to the multiple network devices 1.

Key sharing system 100 comprises multiple configuration servers 2 arranged to configure multiple network devices 1 for key sharing.

FIG. 1a shows network device 300, 350, and 360. There are at least two network devices, but in a typical embodiment the number of network devices is much larger than the number of configuration servers. For example, in an embodiment there are at least 50 times more network devices than configuration servers.

The multiple devices according to an embodiment can establish keys between pairs of them with ease, thus allowing secured communication between any two of them. Accordingly, we refer to the devices as network devices. In an embodiment, communication between two devices uses wireless communication. Other forms of communication are also possible, e.g., wired communication, etc.

Each network device comprises an electronic storage arranged to store a first network device identity number. FIG. 1a shows a first network device 300 with electronic storage 320; a second network device 350 with electronic storage 321; and a third network device 360 with electronic storage 322. To guarantee that the number of different keys that are derivable amongst the multiple network devices is large enough, it is preferred, that the identity number uniquely identifies a network device within the multiple network devices; the latter is not necessary though. For example, the identity number may also function to address the device within the multiple devices; on the other hand an independent addressing mechanism may used, e.g., reserving the identity number for key agreement.

A network device further comprises a receiver, a communication unit, and a shared key unit 330. For clarity, FIG. 1a only shows the electronic storage and the computation unit.

The receiver is arranged to receive multiple local key materials from at least two different configuration servers of multiple configuration servers. The receiver may be a network connection unit, say a wireless connection unit, say Wi-Fi, or a wired connection, say Ethernet. The receiver may also be a proprietary connection, say to load local key material to the device, say, during manufacture.

The network devices receive local key material from different configuration servers. A network device may receive local key material from different types of configuration server. For example, during manufacture, a network device may receive a first local key material, and later receive additional local key material, say over a computer network connection.

After the network devices received their local key material, they do not need intervention by the configuration server to share a key with another network device. The communication unit and the shared key unit of a network device are used by the network device to share a key with another network device of the multiple network devices, e.g., a second network device. The communication unit is arranged to obtain a second network device identity number (B) of the second network device of the multiple network devices, and to provide the first network device identity number to the second network device. The shared key unit 330 is arranged to derive a shared key from the second network device identity number and at least two of the multiple local key materials of the first network device. The second network device perform a similar computation but with its own multiple local key materials and the identity number of the first device. The result of the computations at both ends is a shared key.

Someone with knowledge of the communication between two network devices, say first network device 300 and second network device 350, cannot obtain their shared key, without using unreasonable large resources. Not even device 360 can derive the key shared between devices 300 and 350.

There a number of algorithms for key sharing, e.g., key agreement protocols that may be used in system 100. Two examples thereof of these are described below.

When two network devices need to share a key, e.g. a symmetric key, say to encrypt and/or to authenticate communication between the two devices, each derives a shared key from the second network device identity number and at least two of the multiple local key materials of the first network device. The local key material used to derive the shared key originates from the same root key material.

In the example illustrated in FIG. 1a: first network device 300 receives local key material from configuration servers 200 and 201, i.e., derived from their respective root key material; second network device 350 receives local key material from configuration servers 200, 201 and 202; and third network device 360 receives local key material from configuration servers 201 and 202, i.e., derived from their respective root key material.

For example, first and second network device 300 and 350 have received local key materials from the same two configuration servers 200 and 201. Using these local key materials they may derive a key shared between them.

Using multiple local key materials to derive a shared key may be done in a number of ways.

A first way to derive a shared key from two or more local key materials uses a shared key unit 330 arranged to combine the at least two of the multiple local key materials together obtaining a single combined local key material. The shared key may be derived from the single combined local key material and a received network device identity number. The latter may use a key sharing algorithm from the art, e.g., one of the two examples described further below. For example, the two or more local key materials may be added together to combine them.

Adding local key material to combine is, e.g., suitable for key agreement in which root key material comprises a bivariate polynomial and local key material comprises a univariate polynomials derived from the bivariate polynomial. Adding local key material comprising a univariate polynomial may comprise adding the univariate polynomials, e.g., adding coefficients of monomials having the same power.

The combined local key material may be derived during the key sharing, or during a configuration phase, etc. For example, a network device may be configured for a specific number of local key materials, say 2 or 3 or more; when the network device has received the number of local key materials, the combination is made, e.g., before a key sharing is needed, e.g., before a second network device identity number is received. This operation increases security, as it is avoided that an attacker gains access to individual local key material. However, combination may also take place during key sharing, e.g., after receiving the second network device identity number.

Combining local key material has the additional advantage that security against collusion attacks of network devices increases as the number of local materials used increases.

After the local keying materials are combined they may subsequently be removed, the shared key is derived from a received identifier and the combined key material, which contains at least two local key materials of the first network device.

A second way to derive a shared key from two or more local key materials uses a shared key unit 330 arranged to derive a first intermediate shared key from the second network device identity number and a first local key material of the multiple local key materials of the first network device, and arranged to derive a second intermediate shared key from the second network device identity number and a second local key material of the multiple local key materials of the first network device. The shared key is derived by combining the first and second intermediate keys. Deriving intermediate keys first and combining them to form the shared key is compatible with a wide range of key agreements protocols, e.g., based on Diffie-Hellman.

The intermediate keys may be cryptographic shared keys that could, in principle, be used on their own to protect communication. On the other hand, the intermediate keys may also be unsuitable to use on their own, e.g., because the intermediate keys are not shared. For example, parts of a key sharing algorithm may have been omitted during deriving the intermediate keys that ensures that the intermediate keys are sufficiently likely to be equal for both parties to the key sharing, e.g., the first and second network device, such a modulo operations, reconciliation, and the like. The omitted parts may be done together for the combination of the first and second intermediate keys.

Combining intermediate keys may also be done by adding them. Adding, or some other mathematical operation compatible with the underlying key agreement mechanism, is, e.g., suitable when some operations will be performed on the combined keys. Adding may be done modulo a number. Instead of an elementary arithmetic operation, such adding, xor, multiplication and the like, a key derivation function may be used to derive the shared key from the intermediate keys; the key derivation taking as input at least the first and second intermediate key and producing as output the shared key, or some precursor thereof. For example, a cryptographic hash function, say sha-256, applied to the concatenation of the first and second intermediate key may be used as a key derivation function. A cryptographic key derivation function incompatible with the underlying key agreement mechanism, is suitable for combining intermediate keys that are shared, e.g., equal for both parties, e.g., the first and second network device.

In an embodiment, all of the multiple network devices receive local key material from all of the multiple configuration servers. For example, such an embodiment is suitable for a system in which there are exactly two configuration servers. Receiving local key material from all configuration servers maximize the contribution to security that may be obtained from the different configuration servers. For example, give a number of configuration servers, say 3 or 4, or more, the shared-key units 330 may be arranged to derive shared keys from the same number of local key material.

The latter is not necessary though, different network devices may receive local key material from different configuration servers, possibly also from a different number of configuration server, so that not all network devices have the same number of local key materials. In this embodiment, network devices may be configured, e.g., pre-programmed which local key material to use when deriving a shared key with which network device. The network devices may also be configured to select correct local key materials.

In an embodiment, the multiple local key materials are stored at the first network device together with multiple associated configuration server identifiers. A configuration server identifier indicates the configuration server from which the associated local key material was received at the first network device. Each configuration server is associated with a configuration server identifier that uniquely identifies the configuration servers among the multiple configuration servers. The network devices comprise a configuration unit arranged to agree with the second network device on a subset of multiple configuration server identifiers such that the first and second network device both have local key material associated with the configuration servers of the subset. The configuration units are not separately shown in FIG. 1a. The configuration units are optional.

Figure 1B:
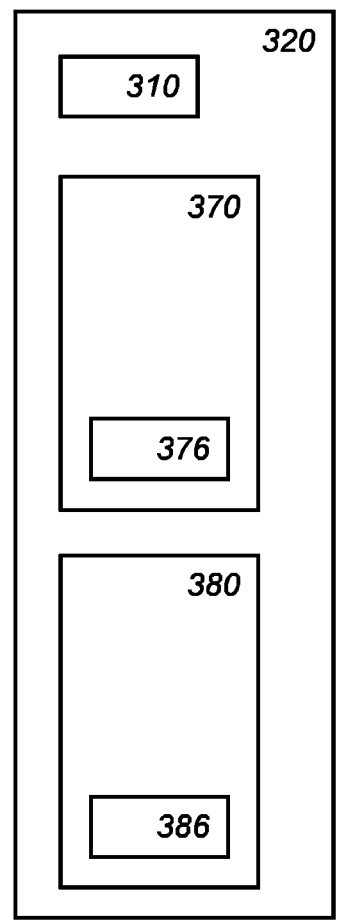

FIG. 1b illustrates an example of an embodiment of electronic storage 320. Storage 320 stores an identity number of first network device 300, a first key material set 370, i.e., a first local key material, and a second a second key material set 380, i.e., a second local key material. Storage 320 also stores a first configuration server identifier 376 associated with the first local key material and a second configuration server identifier 386 associated with the second local key material. For example, first configuration server identifier 376 may identify configuration server 200, and second configuration server identifier 386 may identify configuration server 201.

Returning to FIG. 1a, the configuration unit may be arranged in a number of ways to achieve agreement on a subset of the multiple configuration server identifiers.

For example, the configuration unit of a first network device may be arranged to send the multiple configuration server identifiers to the second network device and to receive the subset from the second network device. The configuration of a second network device with which a first network device is deriving a shared key may be arranged to receive multiple configuration server identifiers from the second network device, to determine an intersection between the received multiple configuration server identifiers and the multiple configuration server identifiers of the first network device, to select the subset from the intersection, and to send the subset to the second network device.

For example, second network device 350 may send third network device 360 configuration identifiers of configuration servers 200, 201, and 202. Third network device 360 may determine an intersection between the received multiple configuration server identifiers and the multiple configuration server identifiers of its own, the third network device, which are configuration server identifier for configuration servers 201 and 202. In this example, the intersection is the configuration identifiers for configuration servers 201 and 202. From this intersection, the third network device 360 then selects the subset. The resulting subset may be send back to the second network device 350. The network devices may use their respective communication units to send messages.

Selecting the subset from the intersection may be done in a number of ways. For example, the intersection may be selected as the subset. This maximize the amount of local key material that is combined in to the shared key, this increases security. However, if the intersection is large a smaller selection may be preferred, reducing overhead. For example, in an embodiment, the configuration unit is arranged to select the full intersection as the subset, in case the number of configuration server identifiers is less or equal than an intersection parameter, say 4 or 5 or more, and to select a intersection parameter number of configuration server identifiers, if the number of configuration server identifiers is more than the intersection parameter. Selecting from an intersection may be done by random selection, or otherwise, for example, taking the first intersection parameter of configuration server identifiers. The intersection parameter may be predetermined or determined dynamically by the configuration unit, e.g., depending on a configurable security parameter of the configuration unit.

In the example shown in FIG. 1*a*, the first network device 300 and third network device 360 have only local key material from a single shared configuration server, in this case configuration server 201. If a configuration unit is used, this may be detected when the intersection is determined. At this point, the configuration unit may produce an error message indicating that deriving a shared key with this network device is not possible because there it not local key material available from at least two of the same configuration servers. In an embodiment, a fall back mechanism may be provided, e.g., a shared key derived from a single local key material may be used. The latter is not preferred as it may allow an attacker to force a fall back situation having lower security. However, in some application this may be preferable over lack of communication. This fall back is not possible if the intersection is empty; the latter may be avoided by ensuring that network devices have at least one local key material from one configuration server. For example, all network devices may receive local key material from at least one particular configuration server, e.g., during manufacture. Additional local key material may be obtained by a network device during use. In this way, the security of the shared key increases during the lifetime of the network device. Moreover, the origin of local key material becomes increasingly obscured, making attacks by powerful adversaries, e.g., that are able to compromise configuration servers, increasingly hard.

Below two key sharing algorithms suitable for use with system 100 are described. Both have the advantage of increased security since the single point of failure caused by compromising a configuration server has been eliminated. Leaking of root key material of a single configuration server does not directly compromise the security of all derived shared keys.

A first cryptographic key sharing mechanism is described, which may be used in system 100. Root key material of a configuration server may comprise a single bivariate polynomial. For example, configuration server i may have bivariate polynomial $R_i(x,y)$. Here the two inputs of the bivariate polynomials are indicated with x and y; these variables are formal variables, for clarity the latter are sometime omitted, e.g., as $R_i(,)$. The bivariate polynomial may be defined over a ring, in particular over the integers modulo a number, more in particular modulo a prime number, e.g., $\mathbb{Z}_p$.

If a configuration server i configures a network device with identity number r, the configuration server computes $R_i(r,x)$ in the ring, say over $\mathbb{Z}_p$ say modulo p; thus obtaining a univariate polynomial. The local key material comprises the univariate polynomial.

As explained above a network device may receive local key material from all or some configuration servers. Although the configuration servers have different root key material, e.g., a different bivariate polynomial, they all share the same ring for computations, e.g., they all compute modulo p, etc.

If a first network device, say first network device 300, wishes to derive a key shared with a second network device, say second network device 350, the two network devices exchange network device identifiers; e.g. the first network device sends identifier A to the second network device and receives identifier B from the second network device.

Below, for clarity, it is assumed that the network devices received local key material from server i=1, and i=2, say servers 200 and 201, and that computations are modulo p; however the variants indicated herein apply mutatis mutandis. The first network device may compute two intermediate keys $R_1(A,B)$ and $R_2(A,B)$. These two intermediate keys may each be reduced modulo p, in this way two shared intermediate keys are obtained. The two shared intermediate keys may be combined into a single shared key using a key derivation function. Reducing modulo p may also be postponed, first adding the intermediate keys and then performing a reduction modulo p. The latter result may directly be used as shared key. If desired a key derivation function with a single input may be used to even out entropy in the key, e.g., applying a hash function.

Instead of deriving intermediate keys, the network devices may also combine the local key material itself. For example, the first network device may add the univariate polynomials $SC(y)=R_1(A,y)+R_2(A,y)$ preferably modulo p, obtaining a single combined local key material SC. To derive a shared key, the network device can now directly evaluate the single combine local key material at the received identity number.

Figure 2:
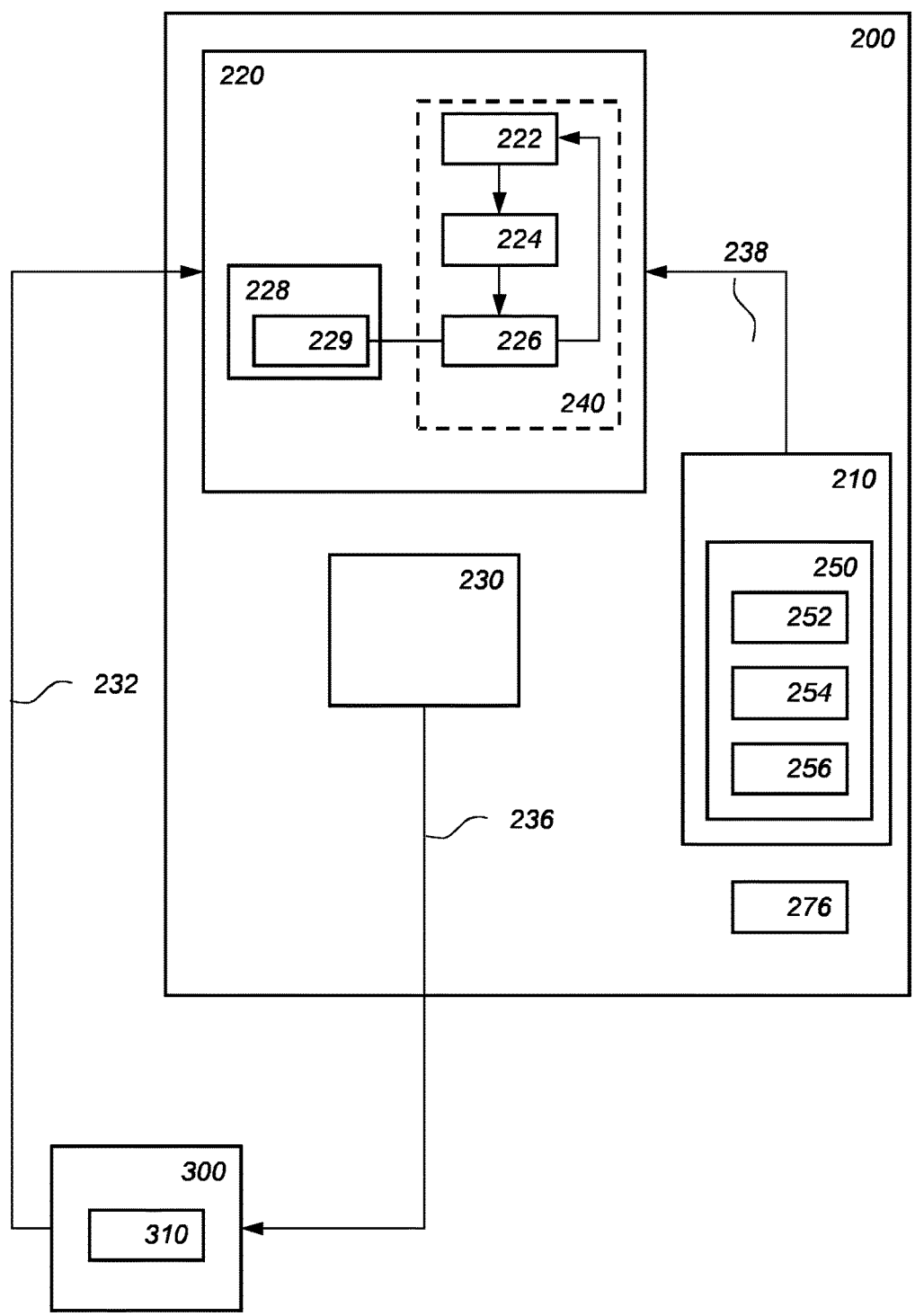
FIG. 2 schematically shows as a block diagram an example of an embodiment of a configuration server 200.
Figure 3:
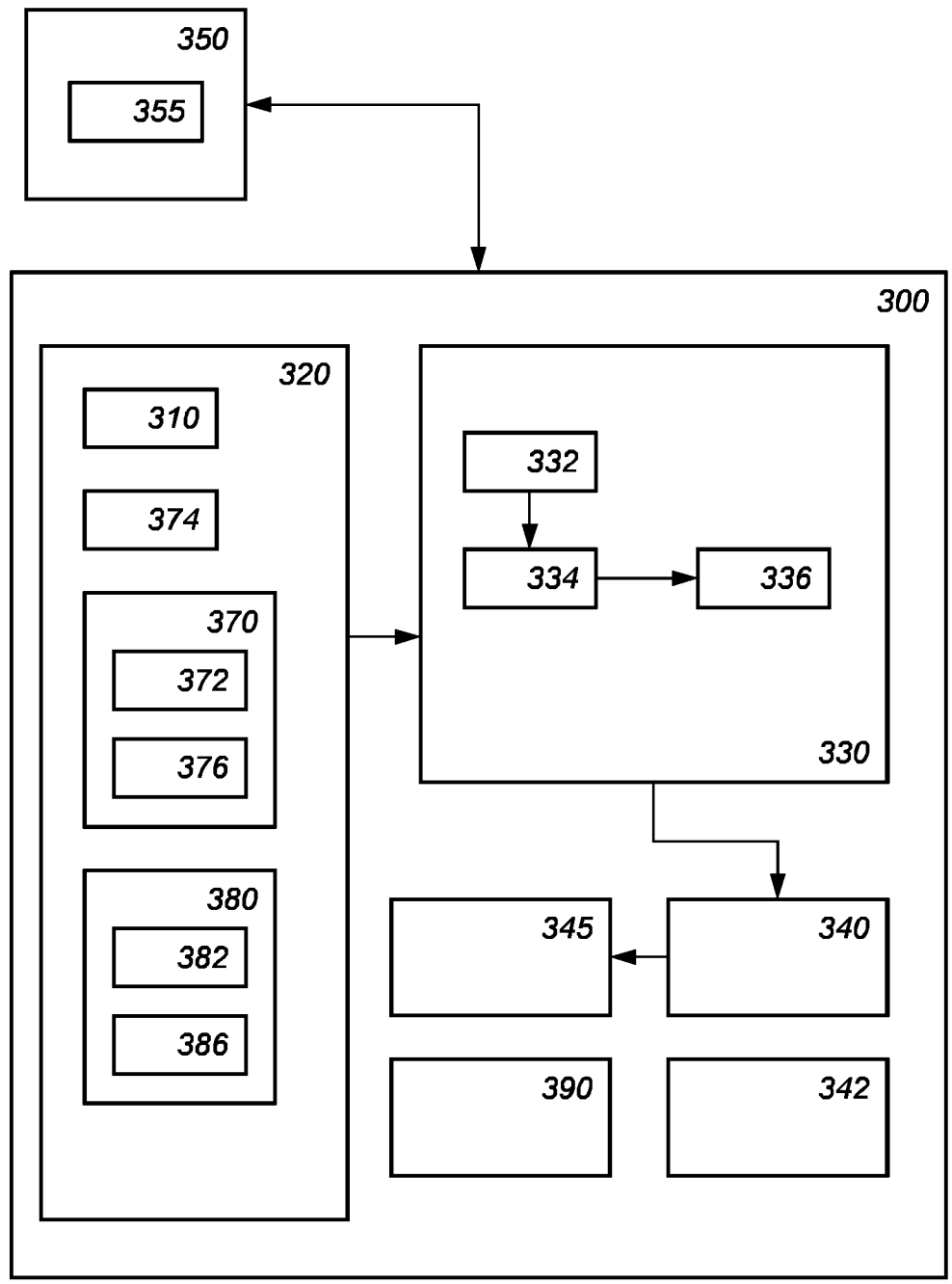
FIG. 3 schematically shows as a block diagram an example of an embodiment of a first network device 300 and a second network device 350.

With reference to FIGS. 2 and 3 a second cryptographic key sharing mechanism is described, which may be used in system 100. Embodiments of the key sharing method are described first in mathematical terms. The key sharing method may be implemented in devices as described below, e.g., on a configuration server 200 for configuring a network device 300, e.g., in a key sharing system 100 and the like. Network devices are also referred to as nodes or network nodes.

The method has a set-up phase and a use phase. The set-up phase may include initiation steps and registration steps. The initiation steps do not involve the network devices.

The initiation steps select system parameters. The initiation steps may be performed by a trusted third party (TTP). The system parameters may also be regarded as given inputs. In that case the trusted third party need not generate them, and the initiation steps may be skipped. For example, the trusted third party may receive the system parameters from a device manufacturer. The device manufacturer may have performed the initiation steps to obtain the system parameters. For convenience of exposition we will refer to the trusted third party as performing the initiation steps, bearing in mind that this is not necessary. One of the configuration servers may have the additional function as trusted third party, e.g., to select system parameters and to distribute them to the other configuration servers.

Initiation Steps

The desired key length for the key that will be shared between devices in the use phase of an instance is selected; this key length is referred to as 'b'. The desired identity number length is also selected. During the later registration steps each device will be associated with an identity number of identity number length; the identity number length is referred to as 'B'. The length of numbers are measured in bits. There may be multiple instances in parallel; each instance allowing the derivation of shared key. There may be a single instance. Each configuration obtain root key material for each instance, each configuration server preferably using the same number of instances. The number of instances may 1.

It is preferred that b≤B, but this is not necessary. For higher resistance against lattice attacks, we may choose b<B. In an embodiment B is a multiple of b, say B is at least 2b, or for recommended security levels, B is at least 4b. A typical value for a low security application may be b=8, B=16. For high security b=8, B=32 is better. With each instance the two parties can derive a shared key. The shared keys can be combined to form a larger combined key. The number of instances is chosen so that the combined key is long enough for the security application in which it will be used.

Smaller values of b with respect to B increase resilience to so-called collusion attacks. In a collusion attack, an attacker obtains information on the shared key used between a target network node and multiple colluding network nodes.

Often the number of instances, the key size and the sub-key lengths will be pre-determined, e.g., by a system designer, and provided to the trusted party as inputs.

Instance Parameters

Next the parameters for each instance are selected. The desired degree is selected; the degree controls the degree of certain polynomials. The degree will be referred to as '$\alpha$', it is at least 1. A practical choice for $\alpha$ is 2. A more secure application may use a higher value of $\alpha$, say 3 or 4, or even higher. For a simple application also $\alpha$=1 is possible. The case $\alpha$=1 is related to the so called 'hidden number problem'; higher "$\alpha$" values are related to the extended hidden number problem confirming that these cases are hard to break. The value $\alpha$=1, although possible, is not recommended, and should only be considered for very low security applications. For low security application a value of $\alpha$>2, say $\alpha$=3 is possible. However, for high security $\alpha$≥32 is recommended, say $\alpha$=32.

The number of polynomials is selected. The number of polynomials will be referred to as 'm'. A practical choice form is 2. A more secure application may use a higher value of m, say 3 or 4, or even higher.

Note that a low-complexity application, say for resource bounded devices may use m=1. The value m=1, although possible, is not recommended, and should only be considered for low security applications. Higher values of security parameters $\alpha$ and m increase the complexity of the system and accordingly increase its intractability. More complicated systems are harder to analyze and thus more resistant to cryptanalysis. Below it is assumed that m≥2.

A public modulus N is selected satisfying $2^{(\alpha+1)B+b-1} \le N$. Preferably, public modulus N is chosen to have exactly $(a+1)B+b$ bits, and thus that also $N<2^{(\alpha+1)B+b}$. For example, N may be chosen at random in this interval. Often the key length b, degree $\alpha$ and number of polynomials m will be pre-determined, e.g., by a system designer and provided to the trusted party as inputs. The public modulus may also be fixed, say in a standard, but more typically will be selected during generation of the parameters.

In an embodiment, all configuration servers obtain the same parameters including public modulus N, shared key size b, identifier size B and degree a. The configuration servers further need private moduli and private bivariate polynomials. It is possible that these are also chosen by the trusted party and distributed to the configuration servers, this still protects against later compromising of a configuration server, yet allows the possibility of a central attack on the trusted party.

In an embodiment, the key material obtainer of each configuration server is arranged to generate at least part of the root key material specific for that configuration server. An important part of the root key material of each configuration server are private moduli and corresponding bivariate polynomials. In an embodiment, the key material obtainer generates at least the private moduli and bivariate moduli for that configuration server; below this is assumed, keeping in mind that it is not absolutely necessary.

In each configuration server, a number of m private moduli $p_1, p_2, \ldots, p_m$ are selected. Moduli are positive integers. In an embodiment, each selected number satisfies the following relationship $p_j = N - \beta_j \cdot 2^b$. Wherein the are $\beta_j$ random B-bits integers, i.e., $\beta_j < 2^B$. More preferably the private moduli have a number of bits exactly equal to the identifier-length B, i.e., $2^{B-1} \le \beta_j < 2^B$. The private moduli are referred to as the second private set.

For m>1, the system is more complicated, and thus more secure, since modulo operation for different moduli are combined even though such operations are not compatible in the usual mathematical sense. For this reason it is advantageous to choose the selected private moduli $p_j$ as pairwise distinct.

If only one configuration server were used that it would be recommended to have m>1, however by combining multiple local key materials, the relationship between the eventual shared key and local key material (whether combined in a single combined local key material or not) becomes less linear. In an embodiment, m=1.

In an embodiment, m≥1, $\alpha$>1, $p_j = N - \beta_j \cdot 2^b$, $\beta_j < 2^B$, and $2^{(\alpha+1)B+b-1} \le N$.

In each configuration server, a number of m bivariate polynomials $f_1, f_2, \ldots, f_m$ of degrees $\alpha_j$ are generated; referred to as the first private set. Preferably, the bivariate polynomials are symmetric; this allows all network devices to agree on a shared key with each other network device. These bivariate polynomials may also be chosen asymmetric. In the later case, the devices are divided into two groups; a first group obtaining local key material by substituting in a first variable of the bivariate polynomials, a second group obtaining local key material by substituting in the second variable of the bivariate polynomials. Devices in one group can only agree on a shared key with devices in the other group.

All degrees satisfy $\alpha_j \le \alpha$, and for at least one j, we have $\alpha_j = \alpha$. A better choice is to take each polynomial of degree $\alpha$. A value of $\alpha$>1 is recommended, and preferably higher values are used. A bivariate polynomial is a polynomial in two variables. A symmetric polynomial f satisfies f(x,y)=f(y,x). Each polynomial $f_j$ is evaluated in the finite ring formed by the integers modulo $p_j$, obtained by computing modulo $p_j$. The integers modulo $p_j$ form a finite ring with $p_j$ elements. The coefficients of polynomial $f_j$ are integers, and represent an element in the finite ring defined by modulo $p_j$ operations. In an embodiment the polynomial $f_j$ is represented with coefficients from 0 up to $p_j-1$. The bivariate polynomials may be selected at random, e.g., by selecting random coefficients within these bounds.

The security of the key sharing depends on these bivariate polynomials as they are the root keying material of the system; so preferably strong measures are taken to protect them, e.g., control procedures, tamper-resistant devices, and the like. Preferably the selected integers $p_1, p_2, \ldots, p_m$ are also kept secret, including the value $\beta_j$ corresponding to $p_j$, though this is less critical. This does not apply to the parameters like N, b, B, m, α, etc, which do not need to be kept secret. We will refer to the bivariate polynomials also in the following form: for $j=1, 2, \ldots, m$, we write $f_j(x,y)=\Sum_{i=0}^{\alpha} f_{i,j}(x)y^i$. For this reason it is acceptable that these parameters are chosen by a trusted third party (TTP), say the first configuration server, and distributed to the other configuration servers.

The above embodiment can be varied in a number of ways. The restrictions on the public and private moduli may be chosen in a variety of ways, such that obfuscation of the univariate polynomial is possible, yet that the shared keys obtained at network devices remain sufficiently close to each other sufficiently often. What is sufficient will depend on the application, the required security level and the computing resources available at the network devices. The above embodiment combines positive integers such that the modular operations which are carried out when generating the polynomials shares are combined in a non-linear manner when they are added over the integers, creating a non-linear structure for the local key material stored on a network device. The above choice for N and $p_j$ has the property that: (i) the size of N is fixed for all network devices; (ii) the non-linear effect appears in the coefficients forming the key material stored on the device. Because of that specific form the shared small key may be generated by reducing modulo $2^b$ after the reduction modulo N.

Registration Steps

In the registration step each network device is assigned local key material, also referred to as keying material (KM), from two or more of the configuration servers. Local key material includes a private univariate key polynomial. A network device can participate in the system according to an embodiment when it has acquired two local key materials from two configuration servers. However, throughout the lifetime of a network device new local key materials may be received at a network device. In an embodiment, a network device receives additional local key material after the network device has derived a shared key.

Keying material comprises keying material for each instance (if multiple instances are used). Below we describe how keying material for one instance is derived for a network device. Each instance has keying material that is unique to that instance, even though parts of the keying material may be shared among different instances. For simplicity we number the two configuration servers whose local key material is used as 1 and 2

A network device is associated with an identity number A. The identity number may be assigned on demand, e.g. by a TTP, or may already be stored in the device, e.g., stored in the device at manufacture, etc. The bit size of A is B bits. Generating A may be done in a variety of ways. For high security the low bits of A are random. For example, A may be selected as a random number; A may be the hash of a further identity number, say a serial number, possibly truncated to B bits.

Configuration server 1 generates a set of keying material for a device A as follows:

$$KM^A,$$

$$1(x) = \sum_{j=1}^{m} <f_{i,j}(x, A)>_{p_{1,j}} = \sum_{i} C_i^{1,A} x^i = G_{1,A}(x)$$

This uses the root key material specific for the first configuration server: the private reduction integers $p_{1,j}$ and the bivariate polynomials $f_{1,j}(,)$. Thus a set of univariate polynomials is obtained, and for each particular polynomial of the first private set, the identity number is substituted (A) into said particular polynomial $f_i(A,x)$ and reducing modulo the reduction integer associated with said particular polynomial. The resulting set of univariate polynomials is summed. The summing may be combined with the generating of the univariate polynomials. is a formal variable; coefficients of like powers of x are added to obtain the coefficients of $G_{1,A}(x)$. Note that the keying material is non-linear. The notation $<\ldots>_{p_j}$ denotes reducing modulo $p_j$ each coefficient of the polynomial between the brackets.

It is possible to add further obfuscating numbers to this, as follows: $KM^{A,1}(x)=\Sum_{j=1}^{m}<f_{1,j}(x,A)>_{p_{1,j}}+2^b\Sum_{i=0}^{\alpha} \in_{A,i} x^i = \Sum_i C_i^{1,A} x^i$. Wherein $KM^{A,1}(x)$ is the keying material of a device with identity number A received from configuration server 1. Stated differently, we have that $C_i^{1,A}=\Sum_{j=1}^{m}\{f_{1,j}(A)\}_{p_{1,j}}+2^b\in^{A,i}$. The notation '$\in_{A,i}$' denotes a random integer, which is an example of an obfuscating number, such that $|\in_{A,i}|<2^{(\alpha+1-i)b}$. Note that any one of the random integers may be positive or negative. The random numbers $\in$ are generated again for each device. The term $\Sum_{i=0}^{\alpha} \in_{A,i} X^i$ thus represents a polynomial in X of degree a, of which the coefficient length is shorter with increasing degree. Alternatively, a more general, but more complicated condition is that $\Sum_{i=0}^{a} |\in_{A,i}| \cdot 2^{ib}$ is small, e.g., $<2^{a+1}$. The mixing effect over different finite rings provides the largest contribution to security, the use of obfuscating numbers is thus optional.

All other additions may either use the natural integer arithmetic, i.e., in the ring $\mathbb{Z}$, or (preferably) they use addition modulo N. So the evaluation of the univariate polynomials $\Sum_{j=1}^{m}<f_{1,j}(x,A)>_{p_{1,j}}$ is each individually done modulo a smaller modulus $p_j$ but the summation of these reduced univariate polynomials themselves is preferably done modulo N. Also adding the obfuscating polynomial $2^b\Sum_{i=1}^{a}\in_{A,i} X^i$ may be done using natural integer arithmetic or, preferably, modulo N. The keying material comprises the coefficients $C_i^A$ with $i=0, \ldots, a$. The keying material may be presented as a polynomial as above. In practice, the keying material may be stored as a list, e.g., an array, of the integers $C_i^A$. The device A also receives the numbers N and b. Manipulation of polynomials may be implemented, e.g., as manipulation of arrays containing the coefficients, e.g., listing all coefficients in a predetermined order. Note that polynomials may be implemented, in other data structures, e.g., as an associative array (also known as a 'map') comprising a collection of (degree, coefficient) pairs, preferably such that each coefficient appears at most once in the collection. The coefficients $C_i^{1,A}$ that are provided to the device are preferably in the range $0, 1, \ldots, N-1$.

Generation of the second keying material proceeds in the same manner by a second configuration server using instead the bivariate polynomials $f_{2,j}$ and the private reduction integers $p_{1,j}$.

Use Phase

Once two devices have an identity number A and B and received their respective keying materials from at least two configuration servers, they may use two keying materials to obtain one shared key.

For example, devices A and B may combine, e.g., in this case, add, the univariate polynomials that are used. Effectively this doubles the value m, providing a significant security increase in addition to the fact that the at least two configuration servers no longer are single points of failure. After adding the univariate polynomials a reduction modulo the public global reduction integer N may be applied.

Using the single combined local key material Device A may perform the following steps, for each instance, to obtain his shared key. First, device A obtains the identity number B of device B, then A generates the shared key by computing the following: $K_{AB} = \langle\langle KM^{c,A}(x)|_{x=B}\rangle_N\rangle_{2^b} = \langle\langle \Sigma_i C_i^{c,A} B^i \rangle_N \rangle_{2^b}$. The superscript 'c' indicates that the combined key material is used.

That is, A evaluates the combined keying material, seen as an integer polynomial, for the value B; the result of evaluating the keying material is an integer. Next device A may reduce the result of the evaluation first modulo the public modulus N and then modulo the key modulus $2^b$. The result will be referred to as A's intermediate key, it is an integer in the range of 0 up to $2^b - 1$. For its part, device B can generate B's intermediate key with A by evaluating its keyed material for identity A and reducing the result modulo N and then modulo $2^b$. Note that $K_{AB}$ is another notation for K(A,B).

If the bivariate polynomials in the root key material are symmetric A's intermediate key and B's intermediate key with A are often, though not necessarily always, equal. The particular requirements on the integers $p_1, p_2, \ldots, p_m$, and on the (optional) random numbers ∈ are such that the keys are often equal and almost always close to each other modulo two to the power the key length.

We will refer to this key also as K(A,B). Here A is the B-bit identifier, i.e., $0 \leq \xi < 2^B$, of device A. [Note that the identifier B of device B is unrelated to the identifier-length which is also referred to as B. For example, the former may be a 128-bit number whereas the latter may be the number 128.]

The b-bit key K(A,B) that device A generates, e.g., for encrypting its communication with device B is not always equal to K(B,A), the key that device B generates, e.g., for encrypting its communication with device A. The difference between these keys is limited, however, in the following sense: it holds that $K(B,A) = \langle K(A,B) + \delta N \rangle_{2^b}$, where N is the public global reduction integer, $\langle \rangle_{2^b}$ denotes the modulo $2^b$ operation and δ is an integer that is bounded in absolute value: $|\delta| \leq \Delta$. K(A,B) is an example of an intermediate key and it defines a set of possible shared keys by adding or subtracting a multiple of a correction term, i.e. a multiple of N. The multiple is less-or-equal than an upper bound, e.g., Δ, and more-or-equal than a lower bound, e.g., −Δ.

Values for the upper and lower bound may be calculated, and depend on the chosen parameters. Relatively sharp bounds on the difference may be obtained by setting half the bits of the keying material to zero. In this case, we have $\Delta \leq 2m + 2\alpha + 1$. Here m denotes the number of mixing polynomials, and α their degree. However, for other embodiments a similar bound may also be obtained by following the derivation of K(A,B) and K(B,A), keeping track of the number of bits that may differ. Without assuming setting coefficients to zero, we have the bound $\Delta \leq 2m$.

At this point it is very likely that the modified intermediate keys of party A and B are equal. If A and B have obtained the same key, then they may use it as a symmetric key which is shared between A and B; for example, it may be used for a variety of cryptographic applications, for example, they may exchange one or more messages encrypted and/or or authenticated using the shared key. Preferably, a key derivation algorithm is applied to the shared key for further protection of the master key, e.g., a hash function may be applied.

Parties A and B may verify that they have indeed obtained the same key after modification by sending key reconciliation data. For example, by sending a hash of the modified key, or sending an encryption of a predetermined string, etc. If the key reconciliation data shows that the same shared key has not been obtained then, the corrected key may be modified to conform to the received key reconciliation data, so that the first device and second device obtain access to an identical shared key. The modifying may involve trying different values of δ, according to the bound thereon. Since the bound is relatively small, the amount of work to find the correct correction term is also possible. Another possibility is to include in the reconciliation data a number of least significant bits of the intermediate key. The correction term will replicate these bits, after reconciliation these bits are discarded.

Instead of using combined key material, the system may also derive an intermediate key from each local key material. The intermediate keys may be separately reconciled and then combined into a single shared key, however it is also possible to first add the intermediate keys modulo N, and then reduce modulo 2^b; that is, the first and second intermediate key are longer than the shared key. The shared key obtained in this manner can be reconciled as indicated above.

The selected m private moduli, $p_1, p_2, \ldots, p_m$, are preferably pair wise relatively prime. If these numbers are pair wise relatively prime the lack of compatibility between the modulo operations is increased. Obtaining pair wise relatively prime numbers may be obtained by selecting the integers in order, testing for each new integer if all pairs of different numbers are still relatively prime, if not the just selected number is removed from the set. This procedure continues until all m numbers are selected. The complexity increases even further by requiring that the selected m private moduli, $p_1, p_2, \ldots, p_m$ are distinct prime numbers.

Combining Multiple Instances

The system described allows network nodes to agree on shared keys that may be small, also smaller than their identifiers. The combination of higher security and practical implementation makes it desirable to choose values of b that are relatively small, say $b \leq 8$ or possibly even $b \leq 16$. One way to increase key length without creating impractically long key material is to combine multiple small keys. The system allows the party to agree on multiple sub-keys which together form the shared key. We will refer to the system that generates a sub-key as a key-agreement instance. Each instance may have its own independent parameters, but operates along the same principles as the other instances. Nevertheless, the multiple instances may share some of their parameters. We will refer to a shared key obtained from a system as described above, i.e., from a single instance, as a 'small' key, and the combination of two or more small keys as a 'large keys'. The number of instances combined is referred to as 't'.

A possible choice is the following parameter set alpha=3, b=8, B=32. To increase security it is advisable to use the full span of 32 bits IDs. In particular, in any interval of length 256, less than 10 IDs should be used. In general, more security is achieved by setting pre-determined first and second identity threshold and choosing identity numbers such that no interval of size of the first identity threshold (e.g. 256) contains more than the second identity threshold (e.g. 10) of identity values. This can be enforced for example, by the network device manager, e.g., by generating identity values according to this rule, or by refusing generation of local key material for devices having an identity value that exceeds the thresholds.

FIG. 2 is a schematic block diagram of a configuration server 200 for configuring a network device for key sharing and a first device 300. We refer to device 300 as a network device.

Configuration server 200 is typically implemented as an integrated device. For example, configuration server 200 may be comprised in a server. Configuration server 200 may configure network devices over a network, say a wireless network, or the internet, and the like. However, configuration server 200 may also be integrated in a manufacturing device for manufacturing the network devices.

Configuration server 200 comprises a key material obtainer 210, a network device manager 230, and a computation unit 220. Configuration server 200 is intended to work with multiple network devices. FIG. 2 shows one such device, first network device 300.

Configuration server 200 selects secret key material, also referred to as root key material. Configuration server 200 then derives local key material for each of the multiple network devices. The local key material is derived from the root key material and at least one public identity number A of the network device. In FIG. 2, network device 300 stores identity number 310. A network device may also have multiple identity numbers, e.g., one per instance. Network device may also store a further identity number and derive the identity number 310 therefrom when needed, e.g., by hashing the further identity number.

The local key material comprises parts that are private to a particular network device, i.e., only accessible to one particular network device and possibly trusted devices. The local key material may also contain parts that, though needed to obtain a shared key, are less critical to keep secret.

The use of the adjectives public and private, is intended as helpful for understanding: Even with access to all public data, the private data cannot be computed, at least not without unreasonable high resources given the security of the application or compared to the resources needed for key generation, encryption, and decryption. However, 'public' does not mean that the corresponding data is necessarily made available to anybody else than configuration server 200 and the network devices. In particular, keeping the public global reduction integer and other public parameters secret from untrusted parties increases security. Likewise, access to private data may be restricted to the party that generated or needs that data, this increases security. However, a trusted party may be allowed access to the private data; Access to private data reduces security.

Using their local key material and the identity number of the other party, the network devices can agree on a shared key between them.

Key material obtainer 210 is configured to obtain in electronic form at least a parameter set 250. The parameter set 250 comprises a public global reduction integer 256, N, a first private set of bivariate polynomials 252, $f_i(,)$, and a second private set of reduction integers 254, $p_i$, with each bivariate polynomial in the first set there is associated a reduction integer of the second set, and a public global reduction integer 256, N. The parameter set is generated for network nodes having identifying number of bit-size B. The parameter set will be used for generating local key material which in turn will be used to derive a shared key. In an embodiment, the bit-size of the small key b satisfies b<B; Although this is not necessary, it makes attacking the system through solving lattice problems harder. In an embodiment, b≤B, particular, b may equal B.

In preferred embodiments, the key material obtainer 210 is configured to obtain in electronic form a parameter set 250. If multiple instances are used, key material obtainer 210 may comprises multiple parameter sets. FIG. 2 shows a parameter set 250.

The public global reduction integer of a parameter set 256, N is preferably different from each of the reduction integers 254 of that set; although this is not strictly necessary. Preferably, the public global reduction integer of a parameter set 256, N is larger than or equal to each of the reduction integers 254 of that parameter set.

Key material obtainer 210 does not need interaction with a network device for obtaining the key material; in particular key material obtainer 210 does not need an identity number. Configuration server 200 may be a distributed system in which key material obtainer 210 is located at a different physical location than computation unit 220. Key material obtainer 210 generates all or part of the key material and/or obtains all or part of the key material from an external source. For example, key material obtainer 210 is suited to receive the public global reduction integers 256 from an external source and generate the first private sets 252 and second sets 254. The latter allows all network devices to be manufactured with a fixed public global reduction integers 256 reducing cost.

Key material obtainer 210 may comprise an electronic random number generator. The random number generator may be a true or pseudo random number generator. Key material obtainer 210 may generate a public global reduction integer N, e.g., using the electronic random number generator; nevertheless the value of N should be the same for all key material obtainers (e.g. 210,211,212 if FIG. 1a). For example, N may be communicated among the configuration servers.

Although, the public global reduction integer is public information, introducing randomness makes analyzing the system more difficult.

With each bivariate polynomial in a first set, a reduction integer from a second set is associated. The random coefficients may be randomly selected from an integer ring, e.g., the integers modulo a number, such as the associated reduction integer.

Key material obtainer 210 may generate one or more coefficients of a reduction integer $p_i$ in a second private set using the electronic random number generator. It is not necessary that the reduction integers are primes. However, they may be chosen as prime to increase resistance. Prime numbers give rise to fields, which is a species of rings. The same parameter sets, i.e., the same first and second private sets, and public global reduction numbers, are used for all network devices that later need to share a key.

Key material obtainer 210 may generate one or more coefficients of a bivariate polynomial $f_i(,)$ in a first private set 252, e.g., using the electronic random number generator. Key material obtainer 210 may generate all of the bivariate polynomial in this fashion. Key material obtainer 210 may use a maximum degree of these polynomials, say 2, or 3 or higher, and generate one more random coefficient than the degree.

It is convenient to prescribe some aspects of first private sets 252 such as the number of polynomials in private sets 252 and the degrees of the polynomials, or the maximum degrees. It may also be prescribed that some of coefficients in the polynomials are zero, e.g., for reducing storage requirements.

A first set may contain two equal polynomials. This will work; however, unless the associated reduction integers are different the sets may be reduced in size. So typically, whenever two or more bivariate polynomials in the first set are the same, the associated reduction integers, i.e. the underlying ring, is different.

In an embodiment all first private sets of bivariate polynomials ($f_i(,)$) only comprise symmetric bivariate polynomials. Using only symmetric polynomials has the advantage that each network device can agree on a shared key with any other network device of the configured network devices. However, a first private set of bivariate polynomials may contain one or more asymmetric polynomials; this has the effect that the devices can be portioned into two groups: a device from one group can only agree on a shared key with a device of the second group.

Key material obtainer 210 is configured to obtain in electronic form a first private set of bivariate polynomials 252, also referred to as $f_i(,)$ in formulas. The embodiment described below assumes that all bivariate polynomials in set 252 are symmetric. Generation of the second parameter set may be done in the same manner.

A symmetric bivariate polynomial may also be notated as $f_i(x,y)$ with two formal variables as placeholder. A symmetric bivariate polynomial satisfies $f_i(x,y)=f_i(y,x)$. This requirement translates to a requirement on the coefficients, e.g., that the coefficient of a monomial $x^a y^b$ equals the coefficient of a monomial $x^b y^a$.

The number of polynomials in first private set 252 may be chosen differently depending on the application. The system will work when the first and second set contain only a single polynomial; in such a system keys may be successfully shared and provide a moderate level of security. However, the security advantage of mixing over different rings is only achieved when the first set has at least 2 polynomials in them, and the second set has at least two different reduction integers.

Private set 252 comprises at least one bivariate polynomial. In an embodiment of a configuration server 200 the private set 252 consists of one polynomial. Having only one polynomial in private set 252 reduces complexity, storage requirements and increases speed. However, having only one polynomial in private set 252 is considered less secure than having two or more polynomials in private set 252 because such a one-polynomial system does not profit from additional mixing in the summation described below. However, key sharing will work correctly and are considered sufficiently secure for low-value and/or low-security applications.

In the remainder, we will assume that private set 252 comprises at least two symmetric bivariate polynomials. In an embodiment, at least two, or even all of the polynomials are different; this complicates analysis of the system considerably. It is not necessary though; private set 252 may comprise two equal polynomials and still benefit from mixing in the summation step if these two polynomials are evaluated over different rings. Note that different reduction integers define different rings. In an embodiment, private set 252 comprises at least two equal polynomials associated with different associated reduction integers. Having two or more equal polynomials in the first set reduces storage requirements. In an embodiment, the second set comprises at least two polynomials, and all polynomials in the second set are different The polynomials in private set 252 may be of different degrees. With the degree of a symmetric bivariate polynomial we will mean the degree of the polynomial in one of the two variables. For example, the degree of $x^2y^2+2xy+1$ equals 2 because the degree in x is 2. The polynomials may be chosen to have the same degree in each variable; if the polynomials in private set 252 are symmetric the degree will be the same in the other variable.

The degrees of polynomials in private set 252 may be chosen differently depending on the application. Private set 252 comprises at least one symmetric bivariate polynomial of degree 1 or higher. In an embodiment, private set 252 comprises only polynomials of degree 1. Having only linear polynomials in private set 252 reduces complexity, storage requirements and increases speed. However, having only degree one polynomials in private set 252 is considered less secure than having at least one polynomial of degree at least two in private set 252 because such a system is considerably more linear. Even so, if multiple polynomials in private set 252 are evaluated over different rings, then the resulting encryption is not linear even if all polynomials in private set 252 are. In an embodiment, private set 252 comprises at least one, preferably two, polynomials of degree 2 or higher. However, key generation, encryption, and decryption will work correctly if only degree 1 polynomials are used, and are considered sufficiently secure for low-value and/or low-security applications.

Having one or more polynomials in private set 252 with degree 0 will not impact the system, so long as the polynomial(s) with higher degree provide sufficient security.

For a mid-security application, private set 252 may comprise, or even consist of, two symmetric bivariate polynomials of degree 2. For a higher security application, private set 252 may comprise or even consist of two symmetric bivariate polynomials, one of degree 2 and one of degree higher than 2, say 3. Increasing the number of polynomials and/or their degrees will further increase security at the cost of increased resource consumption.

Preferably, the reduction integers are selected so that the difference of any two reduction integers in the same set of reduction integers has a common divisor. In particular, common divisor may be $2^b$; or in words, the binary representation of the difference between any two reduction integers end in at least as many zero's as the size of the small key that will be derived from this instance.

For example, one way to generate the reduction integers and the public global reduction integer is as follows.

First generate the public global reduction integer N. For example as a random integer of prescribed size.

For each reduction integer, generate an integer $\beta_i$ and generate the reduction integer $p_i$ as the difference $p_i=N-\beta_i 2^b$.

The public global reduction integer may be chosen to have $(\alpha+1)B+b$ bits or more, wherein $\alpha$ is the highest degree in a single variable of the bivariate polynomials in the first private set. In that case, the integers may be chosen as $\beta_i<2^B$. In an embodiment, the public global reduction integer has at least $(\alpha+1)B+b$ bits, wherein $\alpha$ is the highest degree in a single variable of the bivariate polynomials in the first private set.

Key material obtainer 210 may be programmed in software or in hardware or in a combination thereof. Key material obtainer 210 may share resources with computation unit 220 for polynomial manipulation.

Network device manager 230 is configured to obtain in electronic form an identity number 310, A for network device 300. Network device manager 230 may receive the identity number from the network device. For example, network device manager 230 may comprise or make use of a communication unit for receiving the identity number over a network. For example, network device manager 230 may comprise an antenna for receiving the identity number as a wireless signal. The identity number may be represented as a number of bits, typically, the number of bits in the identity number b is at least as large as the number of bits in the shared key.

System 200 may use the same identity number for all parameter sets. However, it is also possible to use a different identity numbers for different parameters sets. In the latter case, network manager 230 obtains multiple identity numbers.

Computation unit 220 is configured to compute a univariate private key polynomial 229 for a parameter set and an identifying number A. Computation unit 220 is applied to each of the parameter sets of key material obtainer 210. In an embodiment, the computation unit uses the same identifying number for at least two, or even for each of the parameter sets. In an embodiment, the computation unit uses a different identifying number of a network device for at least two, or even for all of the parameter sets. The univariate private key polynomials that are thus obtained and the corresponding public global reduction integers are part of the local key material that will be sent to the network device.

Computation unit 220 receives the data in a parameter set from key material obtainer 210 over connection 238. Below it is described how computation unit 220 determines a univariate private key polynomial from the parameter set. The generation of a univariate private key polynomial from the other parameter set is done in the same manner.

Computation unit 220 may compute the univariate private key polynomial 229 as follows:

Univariate polynomials are obtained by substituting the identity integer A into each of the polynomials in the first private set of the parameter set that is currently processed. By substituting a value for only one variable of a bivariate polynomial, the bivariate polynomial reduces to a univariate polynomial. The resulting univariate polynomial is then reduced modulo the reduction integer associated with the bivariate polynomial in which the identity integer A was substituted. The resulting set of univariate polynomials is summed, e.g., by adding the coefficients of equal powers of y in the polynomials. This may be obtained from the formula for $C_i^A$ in: $KM^A(X) = \Sigma_{j=1}^m <f_j(x,A)>_{p_j} = \Sigma_i C_i^A x^i$.

Suppose $f_i(x,y)$ is one of the bivariate polynomials in the first private set. The coefficients of this polynomial are taken from the ring $\mathbb{Z}_{p_i}$. That is the coefficients of the polynomials in the first set are taken from an integer ring. For simplicity, the variables x and y are used to represent the formal variables of the integers in the first set.

After substitution, computation unit 220 obtains $f_i(A,y)$. Computation unit 220 is further configured to reduce this term modulo $p_i$. Coefficients are reduced in the ring over which the system operates, e.g., $Z_p$, e.g., by reducing mod p. Preferably, computation unit 220 brings the result into a canonical form, i.e., a predetermined standardized representation. A suitable canonical form is representation of the coefficient sorted by degrees of the monomials. Alternatively, the substitution may be for y.

To ensure that the identity numbers act 'random' in the system, a randomization step at point in the chain is advisable to ensure that attacks do not simplify. Especially if the network devices are given identity numbers according to a particular order, e.g., serial numbers, such a randomization step is advisable. For example, a cryptographic hash, say, sha-256 may be applied to the identity number, the result being shortened to B bits. Furthermore, identity numbers may be extended to more bits. For example, an identity number of B' bits may extended, e.g., by hashing and/or concatenation, to B bits, with B'<B. For example and identity number A may be extended to H(A) or to A||H(A); H denotes hashing and || denotes concatenation. The concatenation is done at the LSB side. A highly non-linear hash, such as a cryptographic hash is preferred for this operation.

If the first set only contains symmetric polynomials, then substitution of the identity integer A may be in either one of the two variables of the bivariate polynomial. However, if substitution is done in an asymmetric polynomial, more care is needed. For example computation unit 220 may be configured to obtain whether first network device 300 is in a first or second group. The first and second groups are associated with the first and second variable of the bivariate polynomials, respectively. For a network device in the first group always the first variable is used. For a network device in the second group always the second variable is used.

FIG. 2 shows one possible way to implement this function. FIG. 2 shows a substituting unit 222, a polynomial reduction unit 224, a polynomial addition unit 226 and a sum of a set of univariate polynomials 228; the latter will be univariate private key polynomial 229.

Substituting unit 222, a polynomial reduction unit 224, and a polynomial addition unit 226 may be organized into a computation unit; this option has been indicated by dashed lines in FIG. 2.

These may work as follows. Substituting unit 222 substitutes the identity integer A into a bivariate polynomial of the first set. Substituting unit 222 may collect terms to bring the result in canonical form, but this may also wait. Polynomial reduction unit 224 receives the result of the substitution and reduces it modulo the reduction integer associated with the bivariate polynomial in which was substituted.

The result of substituting the identity integer A into said particular polynomial $f_i(A,y)$ and reducing modulo the reduction integer associated with said particular polynomial is represented as a list of coefficients in a canonical form before the summing by polynomial addition unit 226. The variable y acts as a formal variable. This substitution is sometime notated simply as: $f_i(A,)$.

Polynomial addition unit 226 receives the reduced univariate polynomials and adds them to a running total in sum 228. Sum 228 was reset to 0 prior to the generation of the univariate private key polynomial. Polynomial addition unit 226 may add the polynomials coefficient-wise, using either natural arithmetic or modulo the public global reduction number associated to the parameter set.

When all polynomials of the first private set are processed in this way, the result in sum 228 may be used as the univariate private key polynomial. The resulting univariate private key polynomial, say in sum 228, may be represented as a list of coefficients and in a canonical form.

If system 200 uses multiple instances, i.e., if system 200 uses multiple parameter sets, then computation unit 220 determines a univariate private key polynomial for each of them. If needed unit 220 may re-use some information, e.g., unit 220 may use the same identity number A to generate all univariate private key polynomials. For more security the parameter sets are independent, and preferably also use a different identity number.

Network device manager 230 is further configured for electronically storing the generated univariate private key polynomial 229, the corresponding public global reduction integers 256, N at the network device. Using the univariate private key polynomials 229 and its identity number or numbers, first network device 300 can share keys with other devices configured from the same root material. Network device manager 230 may also be configured for electronically storing the parameters B and b at the network device.

Configuration server 200 may also comprise a configuration server identifier 276, e.g., in an electronic memory. Network device manager 230 may store the configuration server identifier 276 at the network device, e.g., together with key material. The configuration server identifier 276 is optional, and may e.g. be omitted if all network devices receive keying material from the same set of configuration servers.

Electronically storing may comprise that the device manager electronically sends the information to the first device, the first device then stores the information.

Although computation unit 220 may be implemented in software, computation unit 220 is particularly suited for implementation in hardware. If only polynomial reduction unit 224 is implementing hardware a significant speed improvement will be obtained; part of the functionality of system 200 that is not performed by a hardware version of the unit 224 may be performed in software running of a processor.

FIG. 2 shows computation unit 220 receiving an identity number message 232 from first network device 300; first network device 300 receiving a private key material message 236 from computation unit 220. Private key material message 236 may include a public global reduction integer, a univariate private key polynomial computation unit.

These messages typically are sent and received through network device manager 230. Private key material message 236 may be split over multiple messages. If multiple instances are used they may combine their corresponding private key material message into a single message.

Configuration server 200 may be configured to obtain an identity number by generating an identity number for first network device 300. Such a configuration is well suited to a manufacturing facility. In that case first network device 300 receives identity number message 232 from configuration system 200, instead of sending it, say receive identity number message 232 from key material obtainer 210 or computation unit 220.

FIG. 3 is a schematic block diagram of a first network device 300 and a second network device 350. First network device 300 and second network device 350 are configured to determine a shared key together.

Second network device 350 may be of the same design as network device 300. We only describe first network device 300 in detail, second network device 350 may be the same or similar. FIG. 3 only shows that second network device 350 stores an identity number 355. The identity number 355 of second network device 350 is public and may be exchanged with network device 300 to share a key. Second network device 350 also needs local key material (not shown), in particular one or more univariate private key polynomial(s) corresponding to identity number 355.

First network device 300 comprises an electronic storage 320, a communication unit 342, a shared-key unit 330, and a key derivation device 340.

Storage 320 stores local key material of device 300. In the embodiment shown in FIG. 3, the storage 320 comprises a key material set 370 and 380 received from two different configuration servers, e.g., configuration servers 200 and 201. Each key material comprises a univariate private key polynomial, both key materials work with the same public global reduction integer 374. For example, key material 370 comprises univariate private key polynomial 372, and a configuration server identifier 386; For example, key material 380 comprises univariate private key polynomial 382, and a configuration server identifier 386. Local key material 370 and 380 have been received from different configuration servers, public global reduction integer 374 may have been received from a TTP, entered during manufacture or received from a configuration server, e.g., the first one to configure the network device.

This embodiment is described as arranged for a single instance, i.e., key material to derive a single shared key with each other network device. A network device may be supplied with multiple key material sets, which in turn may contain multiple keying materials from multiple configuration servers, to allow the network device to derive multiple shared keys, e.g., to combine to form longer keys. Storage 320 also stores the identity number 310, A, that was used by the configuration servers to generate the univariate private key polynomial in the key material.

In the example shown, the keying material 370 and 380 have not yet been combined. In an embodiment, keying material is combined, e.g., upon receiving it, this would reduce memory requirements and complicate reverse engineering.

Storage 320 may be a memory, say a non-volatile and writable memory, such as flash memory. Storage 320 may be other types of storage, say magnetic storage such as a hard disk. Storage 320 may be write-once memory.

Communication unit 342 is configured to obtain the identity number 355, B of second network device 350. Communication unit 342 may be implemented as a wired connection, say a Wi-Fi, Bluetooth or Zigbee connection. Communication unit 342 may be implemented with a connection over a data network, say the internet.

Shared-key unit 330 is configured to derive a key shared with device 350 corresponding to key material 370 in storage 320. Device 350 has key materials corresponding to key material 370. Below it is described how shared-key unit 330 may derive a single shared key using key material 370; however multiple instances may be combined.

Shared-key unit 330 may comprise a substituting unit 332, and an integer reduction unit 334. Substituting unit 332 and integer reduction unit 334 together form a shared-key unit 330. The latter is indicated with dashed lines.

Shared-key unit 330 is configured to derive an intermediate key between network devices 300 and 350 from a received identity integer B of network device 350 and keying material. This is used to derive a shared key from the second network device identity number and at least two of the multiple local key materials of the first network device.

Deriving an intermediate key from identity integer B and keying material, Shared-key unit 330 is configured to substitute the identity integer B into a univariate private key polynomial, such as univariate private key polynomial 372 and reduce the result of the substitution modulo the public global reduction integer 374. Shared-key unit 330 may use similar hardware or software as substituting unit 222 and polynomial reduction unit 224. Note that first network device 300 does not have access to the first and second private set. The result of reduction unit 334 is an intermediate key.

In an embodiment, the shared-key unit is arranged to combine the at least two of the multiple local key materials of the first network device together obtaining a single combined local key material, the shared key being derived from the second network device identity number and the combined local key material. For example, they may be combined by adding the univariate polynomials, e.g., summing coefficients of equal powers. Shared-key unit may comprise a polynomial adding unit arranged to add univariate polynomials. The sum may be reduced module the global public reduction integer 374. An intermediate key is derived from the combined key material. The latter result may be reduced modulo the public global reduction integer 374 N, followed by reduction modulo $2^b$ and/or reconciliation as indicted below.

Instead of combining keying material before deriving an intermediate key, from which in turn a shared key is derived, the shared key unit 330 may be arranged to derive multiple intermediate keys from multiple local key material. The shared key being derived by combining the first and second intermediate keys. For example, the multiple intermediate keys are first added modulo the public global reduction integer 374 N. The latter result may be reduced modulo $2^b$ and/or reconciled as indicated below.

In an embodiment, different network devices may receive local key material from different configuration servers. In this embodiment, combining key material or intermediate keys requires that the local key material used originates from the same root key material, for both network devices participating in the key sharing.

Storage 320 stores multiple local key materials 370, 380 and together with the optional multiple associated configuration server identifiers 376, 386. Network device 300 comprises the optional configuration unit 390. The configuration unit is arranged to agree with a second network device, say network device 350, on a subset of multiple configuration server identifiers such that the first and second network device both have local key material associated with the configuration servers of the subset. For example, configuration unit 390 may use communication unit 342 to send the multiple configuration server identifiers to the second network device, and to receive the subset from the second network device.

Network device 350 may also comprise a configuration unit which is arranged to receive multiple configuration server identifiers from the first network device 300, to determine an intersection between the received multiple configuration server identifiers and the multiple configuration server identifiers of the second network device, to select a subset from the intersection, and to send the subset to the first network device 300.

Configuration unit 390 may be configured for both functions. For example, configuration unit 390 may be arranged to send the multiple configuration sever identifiers to the other network device when device 300 initiates key sharing, but to select the subset when it did not initiate the key sharing.

Optionally shared-key unit 330 comprises a key-reconciliation unit 336. It may happen that device 300 and device 350 do not arrive at the same shared key. An application may chose to ignore this possibility. In doing so, some pairs of network devices may not be able to engage in encrypted and/or authenticated communication as they lack a common shared key. For some applications it is sufficient that only some pairs of network devices are secured, e.g., ad-hoc networks are an example of this. Devices 300 and 350 may also be configured with an optional key-reconciliation unit 336. In one of the two devices 300 and 350 the key-reconciliation unit 336 generates key-reconciliation data from the generated key and sends it to the other device; in the other device key-reconciliation unit 336 uses received key-reconciliation data to adapt the generated key so that the shared key derived in both devices is the same.

If key-reconciliation unit 336 is used to adapt keys, it adapts the generated key until it conforms to the key-reconciliation data, i.e., deriving key-reconciliation data from the adapted key would give the same result as the received key-reconciliation data for that key. Adapting keys may be done by adding a multiple of the public global reduction integer and reducing modulo $2^b$, i.e., $K_{BA}+\delta N \mod 2^b$. If no reconciliation is performed the intermediate key is directly reduced modulo $2^b$.

For example, the key-reconciliation unit 336 in device 300 obtains a pre-determined number of least significant bits of the generated small key as key-reconciliation data. For example, the pre-determined number c may be chosen as the smallest number such that $2^c \geq 1+2D$, wherein $\alpha$ is the degree of the polynomials in the first private set and m the number of polynomials. D denotes the remaining number of possible keys i.e., the remaining uncertainty in the modified intermediate key. If the least significant bits are used as reconciliation data, the key-reconciliation unit adds multiples until the c least significant bits are the same as the received bits. Even if b=8, then 5 bits remain for each instance. These 5 bits are do not require additional reconciliation however, a key of any desired length may be obtained by combining multiple instances, say 16 instances to obtain an 80 bit shared key.

Key derivation device 340 is configured to derive the shared key from the one or more keys that were derived, e.g., the modified intermediate key(s). The shared key is a so-called symmetric key. The result of the reduction is an integer. This result may be used almost directly as a key, say by concatenating its coefficients optionally after reconciliation.

Deriving the shared key from the result of the reduction may include the application of a key derivation function, for example the function KDF, defined in the OMA DRM Specification of the Open Mobile Alliance (OMA-TS-DRM-DRM-V2_0_2-20080723-A, section 7.1.2 KDF) and similar functions.

Instead of sending and receiving key-reconciliation data per b-bit key, the key-reconciliation unit may also be configured to generate key-reconciliation data over the assembled large shared key, possibly even after a key-reconciliation algorithm like KDF. In this case, the key-reconciliation unit adapts all small keys simultaneously until a large key is found that satisfies the key-reconciliation data. Although varying multiple small keys at the same is much more work, generating key-reconciliation data over the large key is also much more secure as less direct information is available for the small keys.

FIG. 3 further shows an optional cryptographic unit 345 in first network device 300. Cryptographic unit 345 is configured to use the shared key. For example, cryptographic unit 345 may be an encryption unit configured for encrypting an electronic message with the shared symmetric key. For example, cryptographic unit 345 may be a decryption unit configured for decryption an electronic message with the shared symmetric key.

Figure 4:
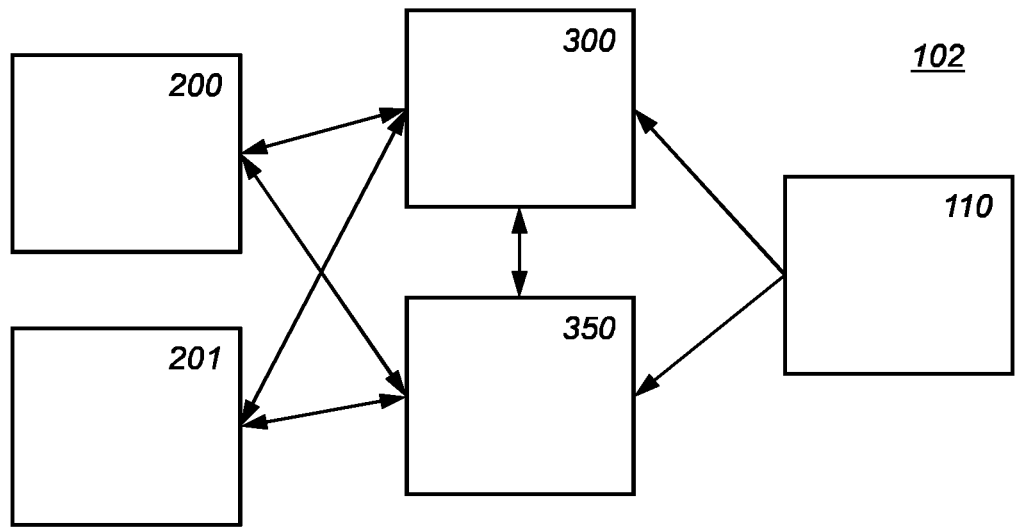
FIG. 4 schematically shows as a block diagram an example of an embodiment of a key sharing system 102, FIG. 5 schematically shows as a flow chart an example of an embodiment of a method 500, FIG. 6 schematically shows as a block diagram an example of an embodiment of an integrated circuit 400.

FIG. 4 is a schematic block diagram of a similar key sharing system 102. System 102 is the same as system 100 except that the network devices receive their identity numbers from a personalization device 110. The network devices then register with configuration server 200 and 201 by sending their identity number. Not even device 360 can obtain the key shared between devices 300 and 350.

The personalization device 110 may assign an identity number that is also used for other purposes. For example, personalization device 110 may assign a network address, such as a MAC address. The network address is used by the network node for routing network traffic from a second network node to itself. However, the network address may also double as the identity number. In this case, the network node makes its network address available to system 200 and 201 and receives a univariate private key polynomial which allows the network node to engage in encrypted communication using its network address as identity number. It is preferred that identity numbers have full entropy, i.e., B bits of entropy. However, when this cannot be realized, it is preferred to perform an entropy smoothing function, e.g., a hash function before using the number as the identity number.

The personalization device 110 may generate identity numbers to increase security of the system by avoiding identity numbers that are close, i.e., that share many or all of the most significant bits. For example, server 110 may generate the identity numbers randomly, say true or pseudo random. It is also sufficient to append predetermined number of random bits to an identity number, say 10 bits. The identity number may have the form $A_1 \| A_2$, in which $A_1$ is not random, say a serial number, network address, or the like, and wherein $A_2$ is random. $A_2$ may be generated by a random number generator. $A_2$ may also be generated by hashing $A_1$. If a keyed hash is used, say an HMAC, this then $A_2$ is indistinguishable from random to parties without access to said key. The key may be generated and stored by server 110.

Server 110 may be included in one of the configuration servers, say in system 200, e.g., incorporated in network manager 230.

Typically, the devices 200, 201, 202 and 300, 350, 360 and 110 each comprise a microprocessor (not shown) which executes appropriate software stored at the device; for example, that software may have been downloaded and/or stored in a corresponding memory, e.g., a volatile memory such as RAM or a non-volatile memory such as Flash (not shown). The devices may also be equipped with microprocessors and memories (not shown). Alternatively, the devices may, in whole or in part, be implemented in programmable logic, e.g., as field-programmable gate array (FPGA). Devices may be implemented, in whole or in part, as a so-called application-specific integrated circuit (ASIC), i.e. an integrated circuit (IC) customized for their particular use.

Figure 6:
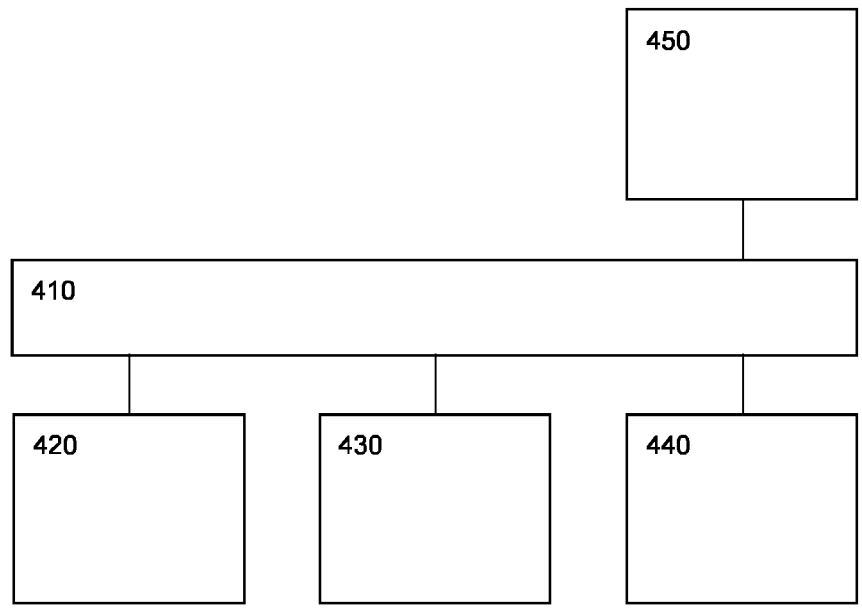

FIG. 6 is schematic block diagram of an integrated circuit 400. Integrated circuit 400 comprises a processor 420, a memory 430, and an I/O unit 440. These units of integrated circuit 400 can communicate amongst each other through an interconnect 410, such as a bus. Processor 420 is configured to execute software stored in memory 430 to execute a method as described herein, e.g. a method to configure a device, or a method to determine a shared key. In this way integrated circuit 400 may be configured as configuration server 200 or as a network device, such as first network device 300; Part of memory 430 may store public global reduction integers, first private sets of bivariate polynomials, second private sets of reduction integers, identity numbers, a plain message and/or encrypted message as required.

I/O unit 440 may be used to communicate with other devices such as devices 200, or 300, for example to receive key data, such as first private set of bivariate polynomials 252 and possibly associated parameters, such as sizes, degrees, moduli and the like, or to send and receive encrypted and/or authenticated messages. I/O unit 440 may comprise an antenna for wireless communication. I/O unit 440 may comprise an electric interface for wired communication.

Integrated circuit 400 may be integrated in a computer, mobile communication device, such as a mobile phone, etc. Integrated circuit 400 may also be integrated in lighting device, e.g., arranged with an LED device. For example, an integrated circuit 400 configured as a network device and arranged with lighting unit such as an LED, may receive commands encrypted with a shared symmetric key.

Multiple network devices, say incorporated in a lighting device, may form the nodes of an encrypted network, in which links are encrypted using shared keys between the nodes.

Integrated circuit 400 may be integrated in other devices that desire fast symmetric key agreement. Integrated circuit 400 may be integrated in a payment system. Integrated circuit 400 may be integrated in a car. A plurality of such cars may be arranged for car-to-car communication, in which car-to-car messages are encrypted and/or authenticated using the shared key.

Although polynomial manipulation may be performed by processor 420 as instructed by polynomial manipulation software stored in memory 430, the tasks of key generation, and calculating the univariate polynomials are faster if integrated circuit 400 is configured with optional computation unit 450. In this embodiment, computation unit 450 is a hardware unit for executing substitution and reduction operations.

Typically, the devices 200, and 300 each comprise a microprocessor (not shown) which executes appropriate software stored at the device 200 and the 300; for example, that software may have been downloaded and/or stored in a corresponding memory, e.g., a volatile memory such as RAM or a non-volatile memory such as Flash (not shown). Alternatively, the devices 200 and 300 may, wholly or partially, be implemented in programmable logic, e.g., as field-programmable gate array (FPGA).

Figure 5:
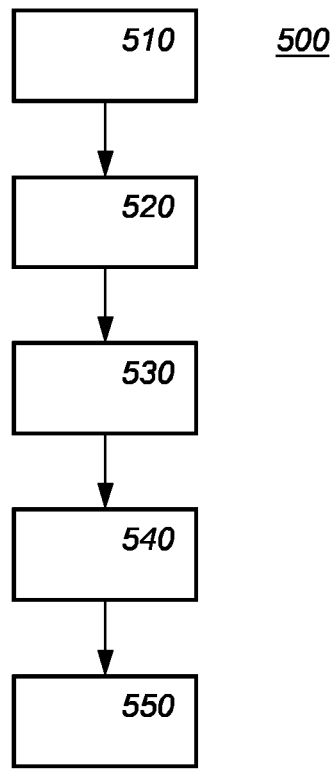

FIG. 5 schematically shows as a flow chart an example of an embodiment of a method 500 to determine a shared key with any one of multiple network devices. The method may be executed, e.g., by any one of device 300, 350 and 360. The method comprises Storing 510 a first network device identity number (310, A), Receiving 520 multiple local key materials from at least two different configuration servers of multiple configuration servers, Obtaining 530 a second network device identity number (355, B) of a second network device of the multiple network devices, Providing 540 the first network device identity number to the second network device, Deriving 550 a shared key from the second network device identity number and at least two of the multiple local key materials of the first network device, the shared key being shared between the first and second network device.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method.

A method according to an embodiment may be executed using software, which comprises instructions for causing a processor system to perform method 500 or 600. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to an embodiment. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A cryptographic system comprising multiple configuration servers arranged to configure multiple network devices for key sharing,
   each configuration server of the multiple configuration servers comprising
   a key material obtainer arranged to obtain in electronic form root key material specific for the respective configuration server of the multiple configuration servers,
   a network device manager arranged to obtain in electronic form a network device identity number (A) of a network device of the multiple network devices that is being configured, and
   a computation unit arranged to compute local key material for the network device that is being configured, wherein the local key material is computed from (i) the root key material specific for the respective configuration server of the multiple configuration servers and (ii) the network device identity number (A), wherein the network device manager is further arranged to provide the computed local key material to the network device that is being configured; and
   each network device of the multiple network devices comprising a shared-key unit, the shared-key unit for receiving at least two local key materials, each local key material being computed by a respective one of at least two configuration servers of the multiple configuration servers, each local key material being provided to said network device from the at least two configuration servers of the multiple configuration servers, the shared-key unit of the network device further being arranged to add said at least two local key materials together to obtain a single combined local key material based on said at least two local key materials.

2. A cryptographic system as in claim 1, wherein, the root key material comprises a bivariate polynomial (R(,)) and computing the local key material by a configuration server for a network device comprises obtaining a univariate polynomial by substituting the network device identity number (A) into said particular polynomial (R(A,)).

3. A cryptographic system comprising multiple configuration servers arranged to configure multiple network devices for key sharing,
   each configuration server comprising
   a key material obtainer arranged to obtain in electronic form root key material specific for the configuration server,
   a network device manager arranged to obtain in electronic form a network device identity number (A) of a network device of the multiple network devices that is being configured,
   a computation unit arranged to compute local key material for the network device from the root key material and the network device identity number (A) and
   the network device manager being further arranged to provide the computed local key material to the network device that is being configured,
   for each network device of the multiple network devices, at least two configuration servers of the multiple configuration servers provide computed local key material to said network device, the network device being arranged to add said at least two provided computed local key materials together obtaining a single combined local key material, wherein,
   the root key material comprises a first private set of bivariate polynomials (f_i (,)), and a second private set of reduction integers (⟦p⟧_i), with each bivariate polynomial in the first set there being associated a reduction integer of the second set,
   local key material is computed by a configuration server for a network device comprising a univariate private key polynomial, the computation unit being arranged to compute the univariate private key polynomial from the first and second private sets by obtaining a set of univariate polynomials by for each particular polynomial of the first private set, substituting the network device identity number (A) into said particular polynomial f_i (A,) and reducing modulo the reduction integer associated with said particular polynomial, and summing the set of univariate polynomials.

4. A cryptographic system as in claim 3, further comprising one or more of (i) wherein the multiple configuration servers are all configured for the same public global reduction integer (N), (ii) differences between a private reduction integer and the public global reduction integer being multiples of a power of 2, and (iii) the computation unit being arranged to reduce the result of summing the set of univariate polynomials modulo the public global reduction integer.

5. A cryptographic system as in claim 4, further wherein each private reduction integer pi satisfies pi=N-β_i 2^b, for some integer β_i with β_i<2^B, wherein the network device identity number is B bits long and the shared key is b bits long.

6. A first network device configured to determine a shared key with any one of multiple network devices, the first network device comprising:
an electronic storage arranged to store a first network device identity number (A),
a receiver arranged to receive multiple local key materials from at least two different configuration servers of multiple configuration servers,
a communication unit arranged to obtain a second network device identity number (B) of a second network device of the multiple network devices, and to provide the first network device identity number to the second network device, and
a shared key unit arranged to derive a shared key from (i) the second network device identity number and (ii) at least two of the multiple local key materials of the first network device, wherein the shared key unit is arranged to combine the at least two of the multiple local key materials of the first network device together to obtain a single combined local key material based on said at least two of the multiple local key materials, wherein the shared key unit is arranged to add the at least two local key materials to combine them, the shared key being derived from the second network device identity number and the single combined local key material.

7. A first network device as in claim 6, wherein the electronic storage is further arranged to store a public global reduction integer (N), the shared key unit being arranged to reduce the combined local key material modulo the public global reduction integer, all network devices of the multiple network devices storing the same public global reduction integer (N).

8. A first network device as in claim 6, wherein the shared key unit is arranged to derive a first intermediate shared key from the second network device identity number and a first local key material of the multiple local key materials of the first network device, and arranged to derive a second intermediate shared key from the second network device identity number and a second local key material of the multiple local key materials of the first network device, the shared key being derived by combining the first and second intermediate keys.

9. A first network device as in claim 6, wherein the multiple local key materials are stored at the first network device together with multiple associated configuration server identifiers, a configuration server identifier indicating a configuration server from which the associated local key material was received at the first network device, the first network device comprising a configuration unit arranged to agree with the second network device on a subset of multiple configuration server identifiers such that the first and second network device both have local key material associated with the configuration servers of the subset.

10. A first network device configured to determine a shared key with any one of multiple network devices, the first network device comprising
an electronic storage arranged to store a first network device identity number (A),
a receiver arranged to receive multiple local key materials from at least two different configuration servers of multiple configuration servers,
a communication unit arranged to obtain a second network device identity number (B) of a second network device of the multiple network devices, and to provide the first network device identity number to the second network device, and
a shared key unit arranged to derive a shared key from the second network device identity number and at least two of the multiple local key materials of the first network device, wherein the shared key unit is arranged to combine the at least two of the multiple local key materials of the first network device together obtaining a single combined local key material, the shared key unit is arranged to add the at least two local key materials to combine them, the shared key being derived from the second network device identity number and the combined local key material,
wherein the multiple local key materials are stored at the first network device together with multiple associated configuration server identifiers, a configuration server identifier indicating a configuration server from which the associated local key material was received at the first network device, the first network device comprising a configuration unit arranged to agree with the second network device on a subset of multiple configuration server identifiers such that the first and second network device both have local key material associated with the configuration servers of the subset, wherein
the configuration unit of the first network device is arranged to provide the multiple configuration server identifiers to the second network device and to receive the subset from the second network device, and/or
the configuration unit of the first network device is arranged to receive multiple configuration server identifiers from the second network device, to determine an intersection between the received multiple configuration server identifiers and the multiple configuration server identifiers of the first network device, to select the subset from the intersection, and to provide the subset to the second network device.

11. A first network device configured to determine a shared key with any one of multiple network devices, the first network device comprising
an electronic storage arranged to store a first network device identity number (A),
a receiver arranged to receive multiple local key materials from at least two different configuration servers of multiple configuration servers,
a communication unit arranged to obtain a second network device identity number (B) of a second network device of the multiple network devices, and to provide the first network device identity number to the second network device, and a shared key unit arranged to derive a shared key from the second network device identity number and at least two of the multiple local key materials of the first network device, wherein the shared key unit is arranged to combine the at least two of the multiple local key materials of the first network device together obtaining a single combined local key material, the shared key unit is arranged to add the at least two local key materials to combine them, the shared key being derived from the second network device identity number and the combined local key material, wherein local key material comprises a univariate private key polynomial, the local key materials being obtained from configuration servers, each configuration server comprising:

a key material obtainer arranged to obtain in electronic form root key material specific for the configuration server, a network device manager arranged to obtain in electronic form a network device identity number (A) of a network device of the multiple network devices that is being configured, a computation unit arranged to compute local key material for the network device from the root key material and the network device identity number and the network device manager being further arranged to provide the computed local key material to the network device that is being configured, for each network device of the multiple network devices, at least two configuration servers of the multiple configuration servers provide computed local key material to said network device, the network device being arranged to add said at least two provided computed local key materials together obtaining a single combined local key material, wherein, the root key material comprises a bivariate polynomial (R(,)) and computing the local key material by a configuration server for a network device comprises obtaining a univariate polynomial by substituting the network device identity number (A) into said particular polynomial (R(A,)); and the electronic storage is arranged to store a public global reduction integer (N), all network devices of the multiple network devices sharing the same public global reduction integer, the shared key unit being arranged to
  substitute the second network device identity integer into the univariate private key polynomial of a local key material of the multiple local key materials or of the combined local key material, and
  reduce the result of the substituting modulo the public global reduction integer (N).

12. A sharing method to determine a shared key with any one of multiple network devices, the method comprising storing a first network device identity number (A) of a first network device of the multiple network devices, receiving multiple local key materials from at least two different configuration servers of multiple configuration servers, obtaining a second network device identity number (B) of a second network device of the multiple network devices, providing the first network device identity number to the second network device, combining, via a shared-key unit of the first network device, at least two of the multiple local key materials of the first network device together to obtain a single combined local key material based on said at least two of the multiple local key materials, further by adding the at least two of the multiple local key materials, and deriving, via the shared-key unit of the first network device, a shared key from the second network device identity number and the single combined local key material of the first network device, the shared key being shared between the first and second network device.

13. A non-transitory computer-readable medium embodied with a computer program comprising computer program code executable by a computer for causing the computer to perform the steps of a method of determine a shared key with any one of multiple network devices when the computer program is run on the computer, the method comprising:

storing a first network device identity number (A) of a first network device of the multiple network devices, receiving multiple local key materials from at least two different configuration servers of multiple configuration servers, obtaining a second network device identity number (B) of a second network device of the multiple network devices, providing the first network device identity number to the second network device, combining, via a shared-key unit of the first network device, at least two of the multiple local key materials of the first network device together to obtain a single combined local key material based on said at least two of the multiple local key materials, further by adding the at least two of the multiple local key materials, and deriving, via the shared-key unit of the first network device, a shared key from the second network device identity number and the single combined local key material of the first network device, the shared key being shared between the first and second network device.

* * * * *